United States Patent
Hong et al.

(10) Patent No.: US 12,532,326 B2
(45) Date of Patent: Jan. 20, 2026

(54) METHOD OF TRANSMITTING AND RECEIVING SIGNAL IN WIRELESS COMMUNICATION SYSTEM AND APPARATUS THEREOF

(71) Applicant: LG Electronics Inc., Seoul (KR)

(72) Inventors: Taehowan Hong, Seoul (KR); Kijun Kim, Seoul (KR); Dongsun Lee, Seoul (KR); Byounggill Kim, Seoul (KR); Jongku Lee, Seoul (KR)

(73) Assignee: LG Electronics Inc., Seoul (KR)

(*) Notice: Subject to any disclaimer, the term of this patent is extended or adjusted under 35 U.S.C. 154(b) by 529 days.

(21) Appl. No.: 18/106,140

(22) Filed: Feb. 6, 2023

(65) Prior Publication Data
US 2024/0073913 A1  Feb. 29, 2024

(30) Foreign Application Priority Data
Aug. 19, 2022 (KR) .......... 10-2022-0103852

(51) Int. Cl.
*H04W 72/23* (2023.01)
*H04L 27/26* (2006.01)
*H04W 76/20* (2018.01)

(52) U.S. Cl.
CPC ......... *H04W 72/23* (2023.01); *H04L 27/2605* (2013.01); *H04L 27/2614* (2013.01); *H04L 27/2636* (2013.01); *H04W 76/20* (2018.02)

(58) Field of Classification Search
CPC .. H04W 72/23; H04W 76/20; H04L 27/2605; H04L 27/2614; H04L 27/2636
See application file for complete search history.

(56) References Cited

U.S. PATENT DOCUMENTS

2019/0208505 A1* 7/2019 Park ............... H04L 5/0053
2019/0230696 A1* 7/2019 Kim ............... H04L 5/00

* cited by examiner

*Primary Examiner* — Samina F Choudhry
(74) *Attorney, Agent, or Firm* — Fish & Richardson P.C.

(57) ABSTRACT

Provided is a method performed by a UE in a wireless communication system including receiving at least one synchronization signal from a base station (BS), receiving system information from the BS, receiving a radio resource control (RRC) message from the BS, wherein the RRC message includes information on a number of data allocation offset index group candidates related to a data allocation offset, receiving downlink control Information (DCI) from the BS, wherein the DCI includes information on a data allocation offset index related to the data allocation offset.

12 Claims, 35 Drawing Sheets

Case #0  The Number of PTRS Group: 2
         The Number of PTRS Sample: 2

Case #1  The Number of PTRS Group: 2
         The Number of PTRS Sample: 4

Case #2  The Number of PTRS Group: 4
         The Number of PTRS Sample: 2

Case #3  The Number of PTRS Group: 4
         The Number of PTRS Sample: 4

Case #4  The Number of PTRS Group: 8
         The Number of PTRS Sample: 4

$M_{SC}^{PUSCH}$ time

Simulation Parameters
- Number of FDMed UEs: 3
- M-DFT size : 192
- N-IFFT size : 1024
- Cyclic shift size: $\frac{1}{2}N, \frac{1}{4}N, \frac{1}{8}N$
- Data allocation offset size: $\frac{1}{2}M, \frac{1}{4}M, \frac{1}{8}M$
- Total data size : 576
- Modulation order : QPSK Simulation Parameters
- Number of FDMed UEs: 3
- M-DFT size : 192
- N-IFFT size : 1024
- Data allocation offset size: $\frac{1}{4}$M
- The Number of PTRS group:4
- The Number of PTRS sample:4
- Total data size : 576
- Modulation order : QPSK

METHOD OF TRANSMITTING AND RECEIVING SIGNAL IN WIRELESS COMMUNICATION SYSTEM AND APPARATUS THEREOF

CROSS-REFERENCE TO RELATED APPLICATIONS

This application claims priority to and the benefit of Korean Application No. 10-2022-0103852, filed on Aug. 19, 2022, the contents of which are all hereby incorporated by reference herein in their entirety.

BACKGROUND

Field

The present disclosure relates to a method and apparatus for transmitting and receiving signals in a wireless communication system, and more particularly, to a method and apparatus for transmitting and receiving signals in a wireless communication system in which discrete Fourier transform-spreading-orthogonal frequency division multiplexing (DFT-s-OFDM) is applied to downlink.

Related Art

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

Meanwhile, in 5G NR, DFT-s-OFDM is applied to uplink and OFDM is applied to downlink. When OFDM is applied to downlink in a high frequency band, such as a terahertz band, there is a problem in that a peak-to-average power ratio (PAPR) value increases. In order to solve this problem, application of DFT-s-OFDM to downlink in a terahertz band communication system has been discussed.

SUMMARY

The present disclosure provides a method and apparatus for transmitting and receiving signals of a user equipment (UE) and a base station (BS) in a wireless communication system.

The present disclosure also provides a method and apparatus for transmitting and receiving signals in a wireless communication system that reduces a PAPR that occurs when multiple access of DFT-s-OFDM is supported in a downlink in a frequency division multiple access (FDMA) method.

The present disclosure also provides a method and apparatus for transmitting and receiving signals in a wireless communication system capable of preventing distortion of a phase tracking-reference signal configuration.

Technical objects to be achieved by the present disclosure are not limited to the aforementioned technical objects, and other technical objects not described above may be evidently understood by a person having ordinary skill in the art to which the present disclosure pertains from the following description.

In an aspect, a method performed by a BS in a wireless communication system includes: applying a data allocation offset to each of a plurality of resources to which data and a reference signal group for each of a plurality of UEs are mapped; performing discrete Fourier transform (DFT) on each of the plurality of resources to which the data allocation offset is applied; performing an inverse fast Fourier transform (IFFT) on each of the plurality of resources on which the DFT is performed, to generate a discrete Fourier transform spread orthogonal frequency division multiplexing (DFT-s-OFDM) symbol; and adding a cyclic prefix (CP) to the DFT-s-OFDM symbol to generate a downlink signal.

The data allocation offset may be set to minimize a peak-to-average power ratio (PAPR) of the DFT-s-OFDM symbol.

The applying of the data allocation offset to each of the plurality of resources may include applying the same data allocation offset to the data and the reference signal group.

The applying of the data allocation offset to each of the plurality of resources may include applying the data allocation offset to the data mapped to each of the plurality of resources.

The number of candidates of the data allocation offset may be less than or equal to the number of reference signal groups.

In another aspect, a BS operating in a wireless communication system includes: one or more transceivers; one or more processors configured to control the one or more transceivers; and a memory including one or more instructions to be executed by the one or more processors, wherein the one or more instructions include: applying a data allocation offset to each of a plurality of resources to which data and a reference signal group for each of a plurality of UEs are mapped; performing discrete Fourier transform (DFT) on each of the plurality of resources to which the data allocation offset is applied; performing an inverse fast Fourier transform (IFFT) on each of the plurality of resources on which the DFT is performed, to generate a discrete Fourier transform spread orthogonal frequency division multiplexing (DFT-s-OFDM) symbol; and adding a cyclic prefix (CP) to the DFT-s-OFDM symbol to generate a downlink signal.

The data allocation offset may be set to minimize a peak-to-average power ratio (PAPR) of the DFT-s-OFDM symbol.

The applying of the data allocation offset to each of the plurality of resources may include applying the same data allocation offset to the data and the reference signal group.

The applying of the data allocation offset to each of the plurality of resources may include applying the data allocation offset to the data mapped to each of the plurality of resources.

The number of candidates of the data allocation offset may be less than or equal to the number of reference signal groups.

In another aspect, a method performed by a user equipment (UE) in a wireless communication system includes: receiving a downlink signal from a BS; removing a cyclic prefix (CP) from the downlink signal and obtaining a discrete Fourier transform spread orthogonal frequency division multiplexing (DFT-s-OFDM) symbol; performing fast Fourier transform (FFT) on the DFT-s-OFDM symbol to obtain resources to which data and a reference signal group are mapped; performing IDFT (Inverse Discrete Fourier Transform) on the resource; compensating for a data allocation offset applied to the resource based on information on a location to which the data is mapped; and performing demodulation on the resource for which the data allocation offset is compensated.

The method may further include: receiving the information on the location to which the data is mapped.

The receiving of the information on a location to which the data is mapped may include: receiving a radio resource control (RRC) message including information on a number of candidates for the data allocation offset from the BS; and receiving downlink control Information (DCI) including an index of the data allocation offset from the BS.

The receiving of the information on a location to which the data is mapped includes receiving DCI including an index of a modulation symbol block from the BS.

In another aspect, a user equipment (UE) operating in a wireless communication system includes: one or more transceivers; one or more processors configured to control the one or more transceivers; and a memory including one or more instructions to be executed by the one or more processors, wherein the one or more instructions include: receiving a downlink signal from a BS; removing a cyclic prefix (CP) from the downlink signal and obtaining a discrete Fourier transform spread orthogonal frequency division multiplexing (DFT-s-OFDM) symbol; performing fast Fourier transform (FFT) on the DFT-s-OFDM symbol to obtain resources to which data and a reference signal group are mapped; performing IDFT (Inverse Discrete Fourier Transform) on the resource; compensating for a data allocation offset applied to the resource based on information on a location to which the data is mapped; and performing demodulation on the resource for which the data allocation offset is compensated.

The UE may further include: receiving the information on the location to which the data is mapped.

The receiving of the information on a location to which the data is mapped may include: receiving a radio resource control (RRC) message including information on a number of candidates for the data allocation offset from the BS; and receiving downlink control Information (DCI) including an index of the data allocation offset from the BS.

The receiving of the information on a location to which the data is mapped may include: receiving DCI including an index of a modulation symbol block from the BS.

In another aspect, an apparatus includes one or more memories and one or more processors functionally connected to the one or more memories, wherein the one or more processors operate so that the apparatus applies a data allocation offset to each of a plurality of resources to which data and a reference signal group for each of a plurality of UEs are mapped, performs discrete Fourier transform (DFT) on each of the plurality of resources to which the data allocation offset is applied, performs an inverse fast Fourier transform (IFFT) on each of the plurality of resources on which the DFT is performed, to generate a discrete Fourier transform spread orthogonal frequency division multiplexing (DFT-s-OFDM) symbol, and adds a cyclic prefix (CP) to the DFT-s-OFDM symbol to generate a downlink signal.

In another aspect, one or more non-transitory computer-readable mediums storing one or more instructions, operate to apply a data allocation offset to each of a plurality of resources to which data and a reference signal group for each of a plurality of UEs are mapped, perform discrete Fourier transform (DFT) on each of the plurality of resources to which the data allocation offset is applied, perform an inverse fast Fourier transform (IFFT) on each of the plurality of resources on which the DFT is performed, to generate a discrete Fourier transform spread orthogonal frequency division multiplexing (DFT-s-OFDM) symbol, and add a cyclic prefix (CP) to the DFT-s-OFDM symbol to generate a downlink signal.

According to an embodiment of the present disclosure, PAPR may be reduced by applying a data allocation offset to a symbol to which data is allocated before a BS performs DFT.

According to an embodiment of the present disclosure, even if a data allocation offset is applied to symbols to which data and a phase reference signal are allocated, distortion of a phase tracking reference signal configuration is prevented, thereby preventing a degradation of reception performance due to RF impairment.

The effects obtainable in the present disclosure are not limited to the effects mentioned above, and other effects not mentioned will be clearly understood by those skilled in the art from the description below.

BRIEF DESCRIPTION OF THE DRAWINGS

The accompany drawings, which are included to provide a further understanding of the present disclosure and are incorporated on and constitute a part of this specification illustrate embodiments of the present disclosure and together with the description serve to explain the principles of the present disclosure.

DESCRIPTION OF EXEMPLARY EMBODIMENTS

Figure 1:
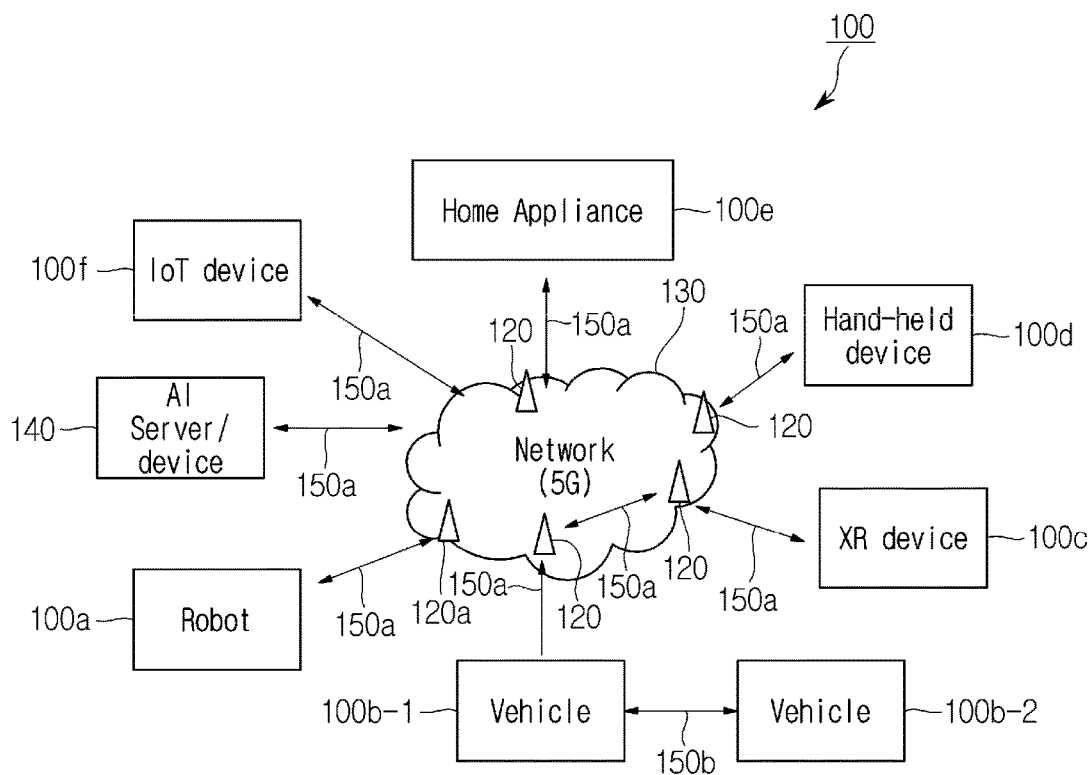
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced. Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18, "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/froth each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
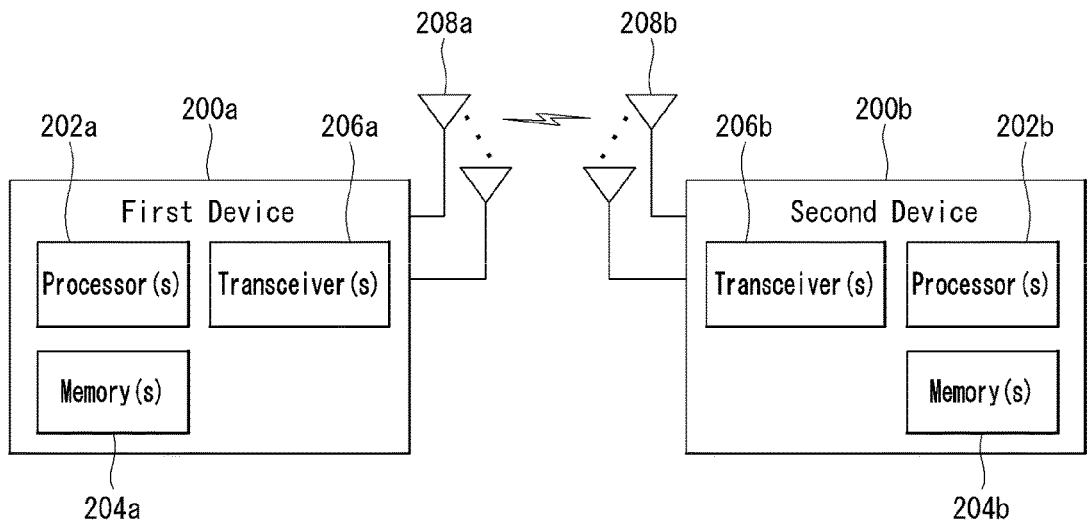
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 04b may be connected with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be connected with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SLAP (service data adaptation protocol)). One or more processors 202a and 202b may generate one or more protocol data nits (PDUs) and/or one or more service data unit (SDU) according to the descriptions, functions, procedures, proposals, methods and/or operational flowcharts disclosed herein. One or more processors 202a and 202b may generate messages, control information, data or information according to the descriptions, functions, procedures, proposals, methods and; or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be connected with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be connected with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be connected with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be connected with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Figure 3:
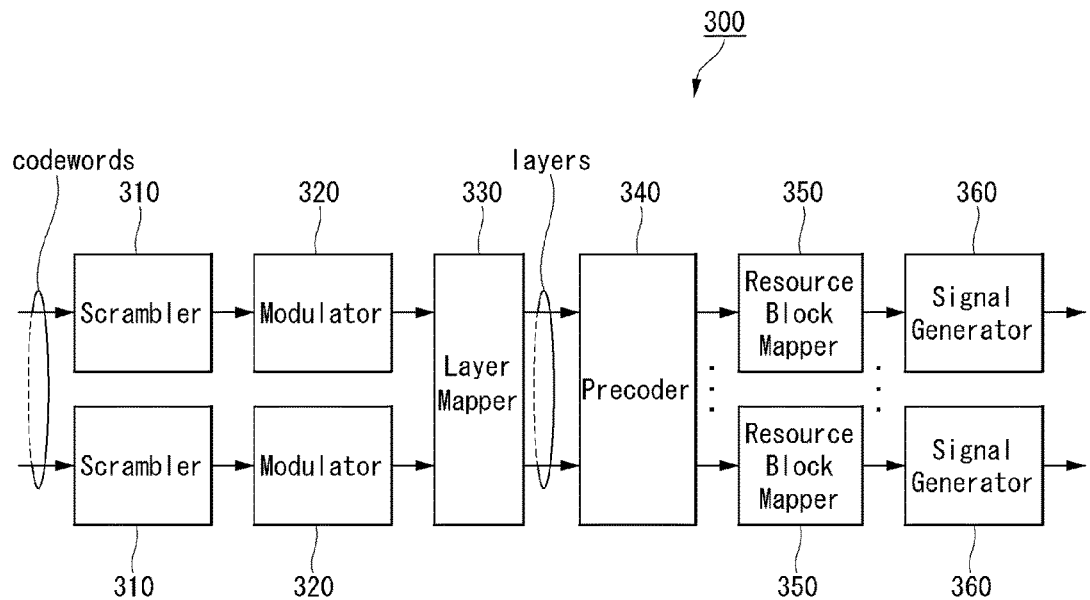
FIG. 3 is a view showing a method of processing a transmitted signal applicable to the present disclosure.

FIG. 3 is a view showing a method of processing a transmitted signal applicable to the present disclosure. For example, the transmitted signal may be processed by a signal processing circuit. At this time, a signal processing circuit 300 may include a scrambler 310, a modulator 320, a layer mapper 330, a precoder 340, a resource mapper 350, and a signal generator 360. At this time, for example, the operation/function of FIG. 3 may be performed by the processors 202*a* and 202*b* and/or the transceiver 206*a* and 206*b* of FIG. 2. In addition, for example, the hardware element of FIG. 3 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 310 to 350 may be implemented in the processors 202*a* and 202*b* of FIG. 2 and a block 360 may be implemented in the transceivers 206*a* and 206*b* of FIG. 2, without being limited to the above-described embodiments.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shill keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IMO module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

Figure 4:
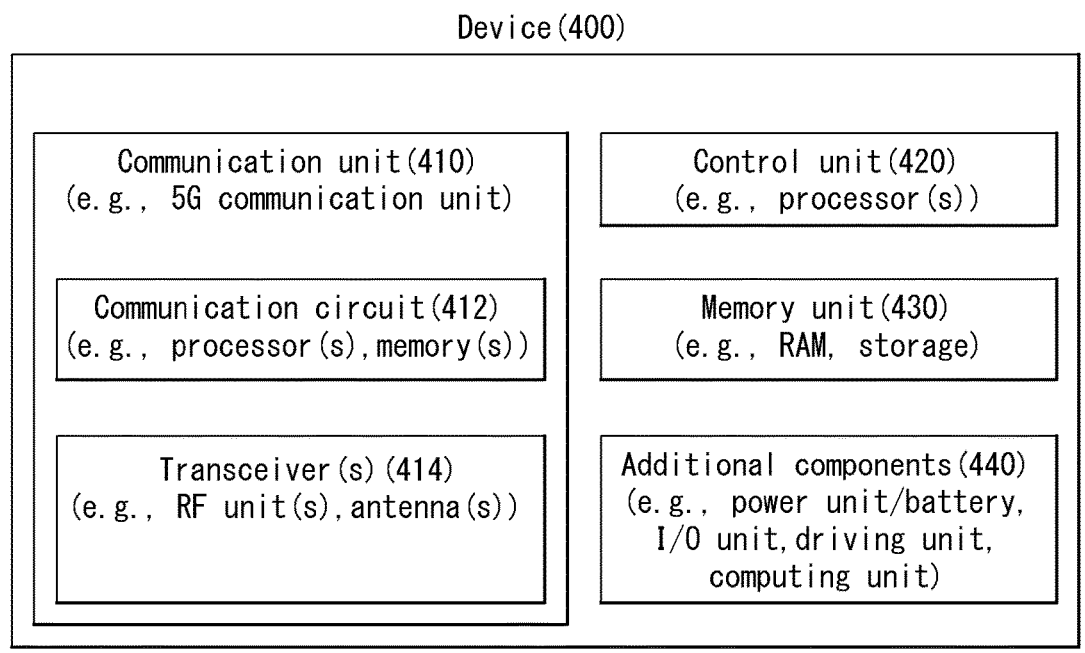
FIG. 4 is a view showing another example of a wireless device applicable to the present disclosure.

FIG. 4 is a view showing another example of a wireless device applicable to the present disclosure.

Referring to FIG. 4, a wireless device 400 may correspond to the wireless devices 200*a* and 200*b* of FIG. 2 and include various elements, components, units/portions and/or modules. For example, the Tireless device 300 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202*a* and 202*b* and/or one or more memories 204*a* and 204*b* of FIG. 2. For example, the transceiver(s) 414 may include one or more transceivers 206*a* and 206*b* and/or one or more antennas 208a and 208b of FIG. 2. The control unit 420 may be electrically connected with the communication unit 410, the memory unit 430 and the additional components 440 to control overall operation of the wireless device. For example, the control unit 420 may control electrical/mechanical operation of the Tireless device based on a program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 300 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 5:
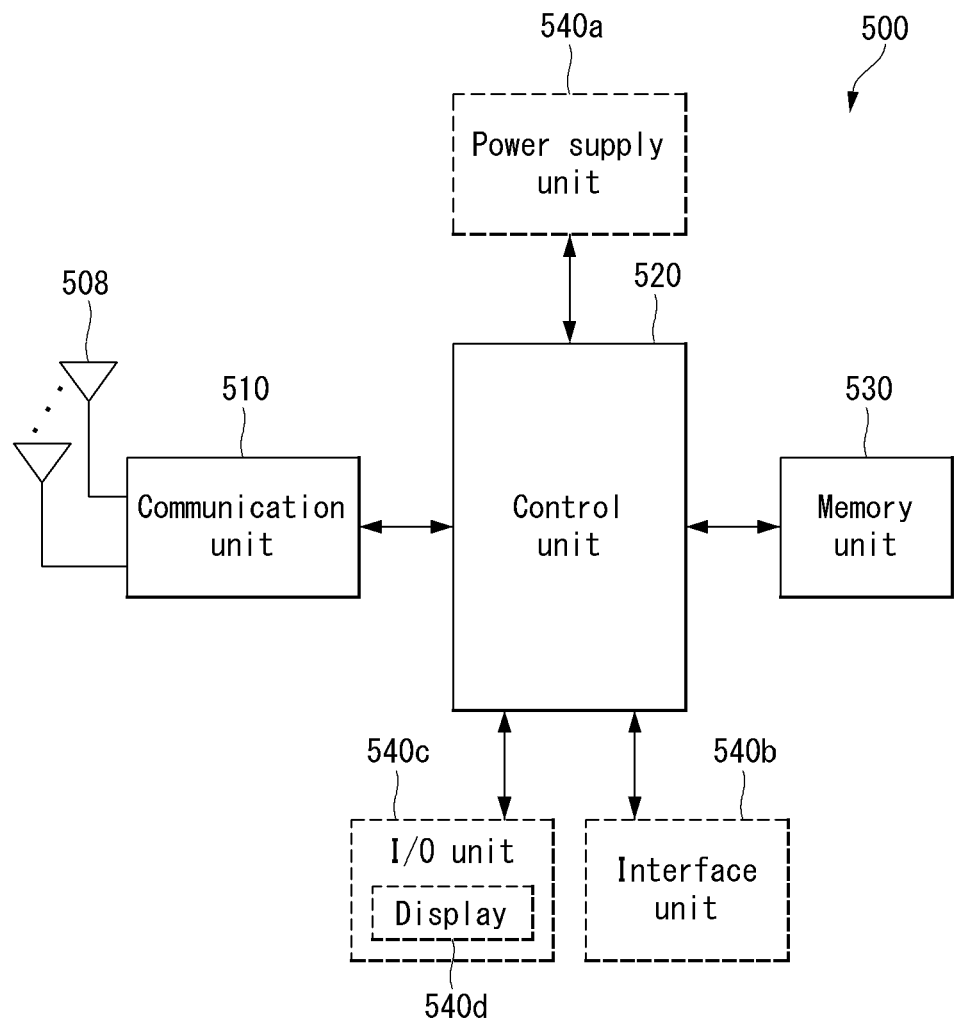
FIG. 5 is a view showing an example of a hand-field device applicable to the present disclosure.

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 400 may include an antenna unit (antenna) 508, a communication unit (transceiver) 510, a control unit (controller) 520, a memory unit (memory) 530, a power supply unit (power supply) 540a, an interface unit (interface) 540b, and an input/output unit 540c. An antenna unit (antenna) 508 may be part of the communication unit 510. The blocks 510 to 530/540a to 540c may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 400. In addition, the memory unit 530 may store input/output data/information, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output video information/signals, audio information/signals, data and/or user input information. The input/output unit 540c may include a camera, a microphone, a user input unit, a display 540d, a speaker and/or a haptic module.

For example, in case of data communication, the input/output unit 540c may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540c in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 6:
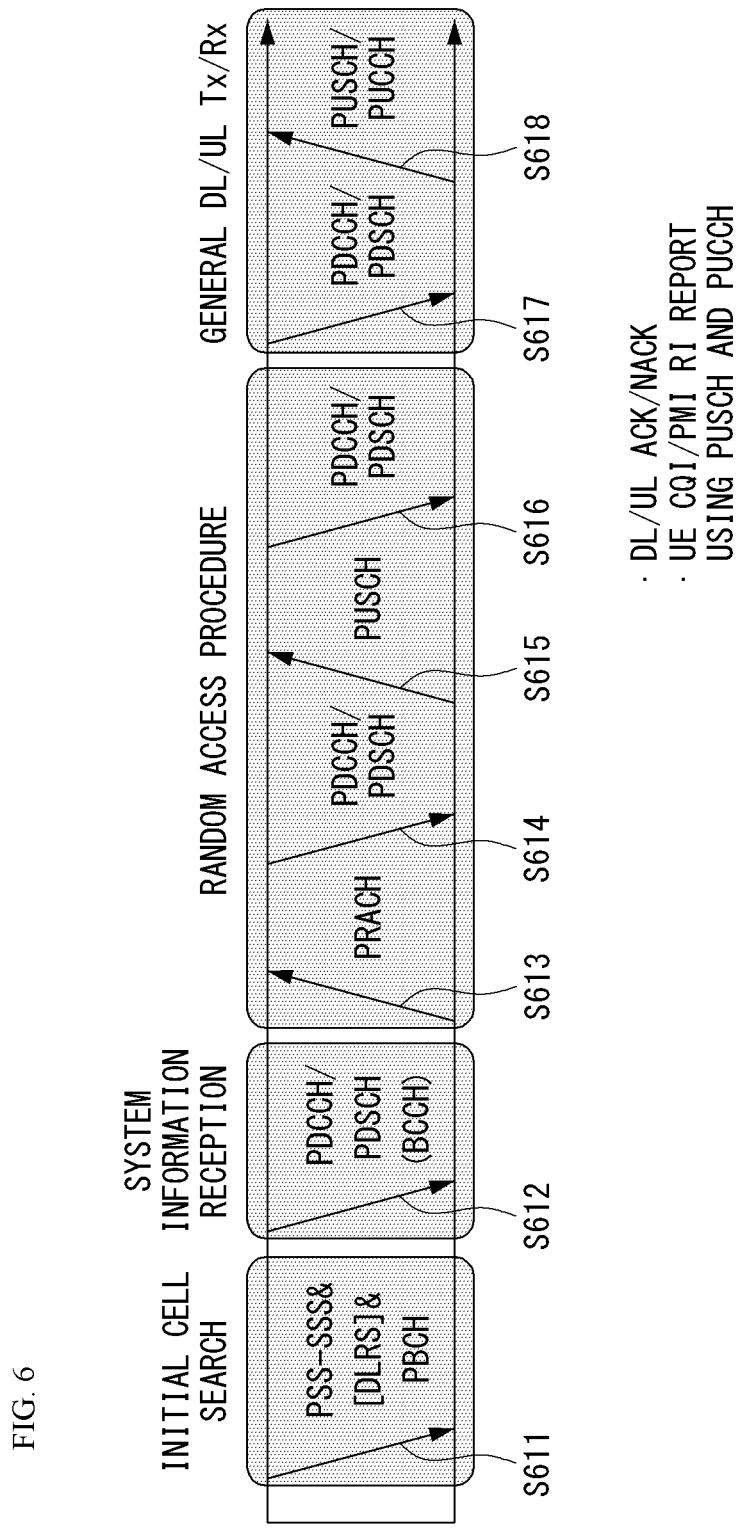
FIG. 6 is a view showing physical channels applicable to the present disclosure and a signal transmission method using the same.

FIG. 6 is a view showing physical channels applicable to the present disclosure and a signal transmission method using the same.

The UE which is turned on again in a state of being turned off or has newly entered a cell performs initial cell search operation in step S611 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 7:
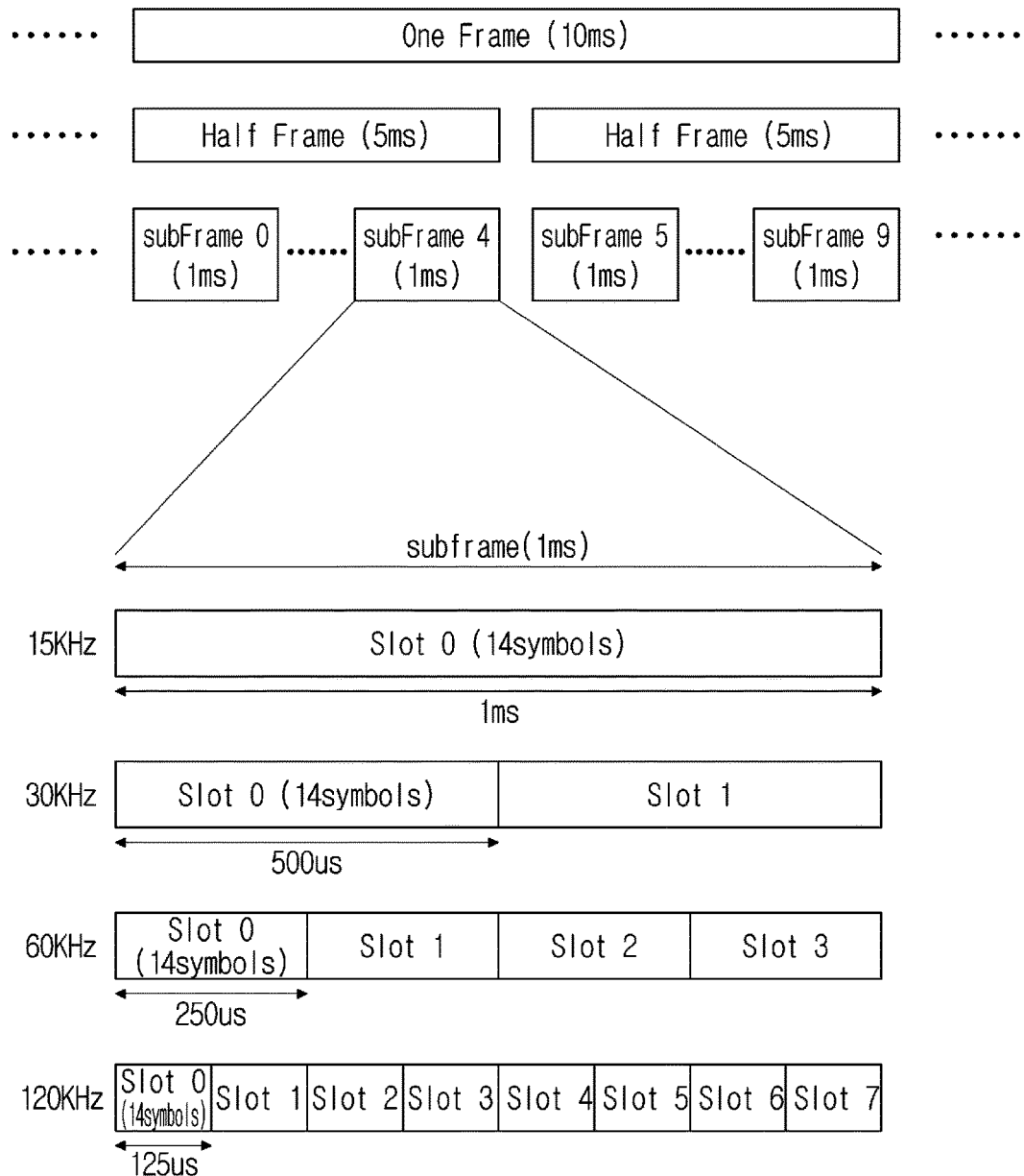
FIG. 7 is a view showing the structure of a radio frame applicable to the present disclosure.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 1-continued

| $\mu$ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |
| 5 | 14 | 320 | 32 |

TABLE 2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above $N_{symb}^{slot}$ may indicate the number of symbols in a slot, $N_{slot}^{frame,\mu}$ may indicate the number of slots in a frame, and $N_{slot}^{subframe,\mu}$ may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 8:
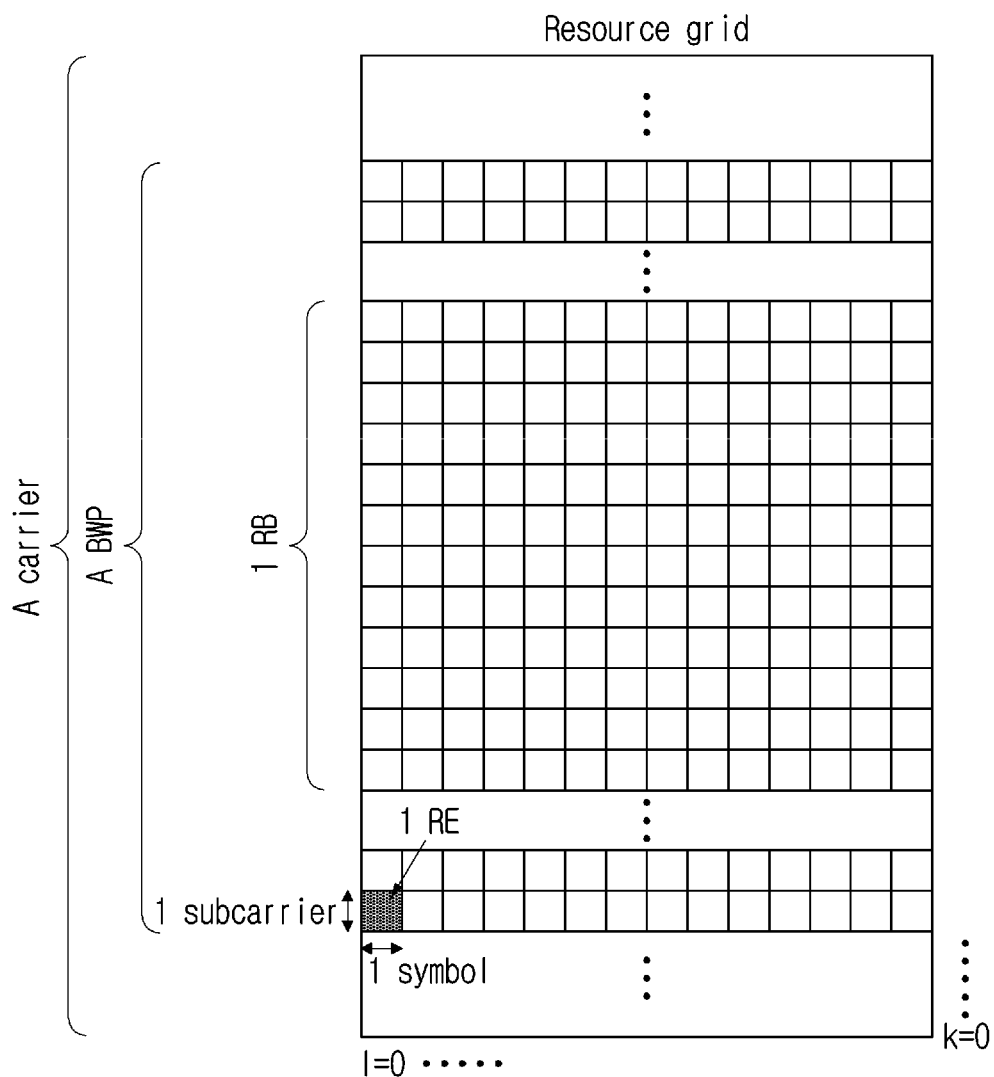
FIG. 8 is a view showing a slot structure applicable to the present disclosure.

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 9:
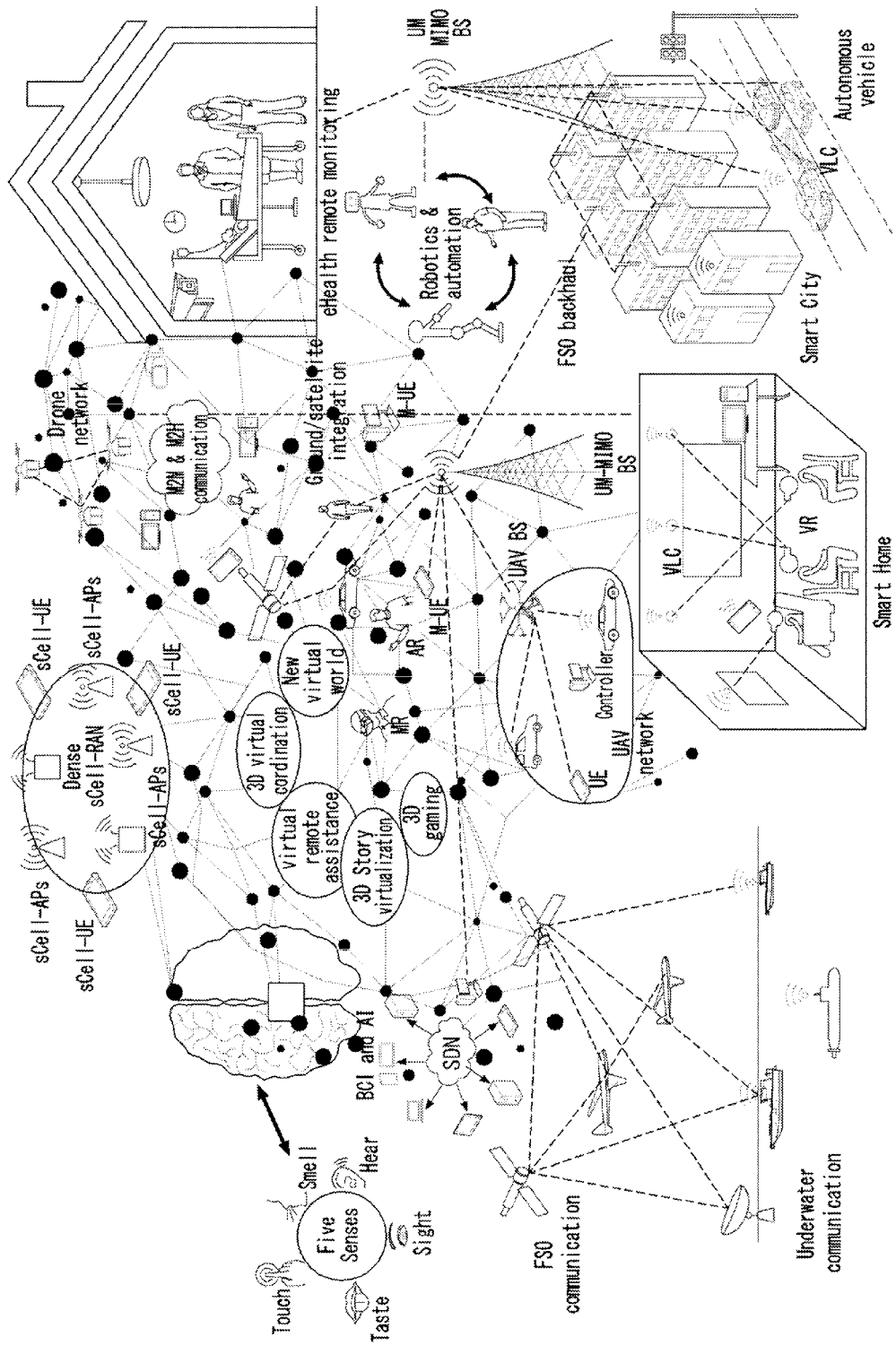
FIG. 9 is a view showing an example of a communication structure providable in a 6G system applicable to the present disclosure.

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimension connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep seaming-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-TH communication with wide bandwidth and applying advanced massive MIMO technology.

Figure 10:
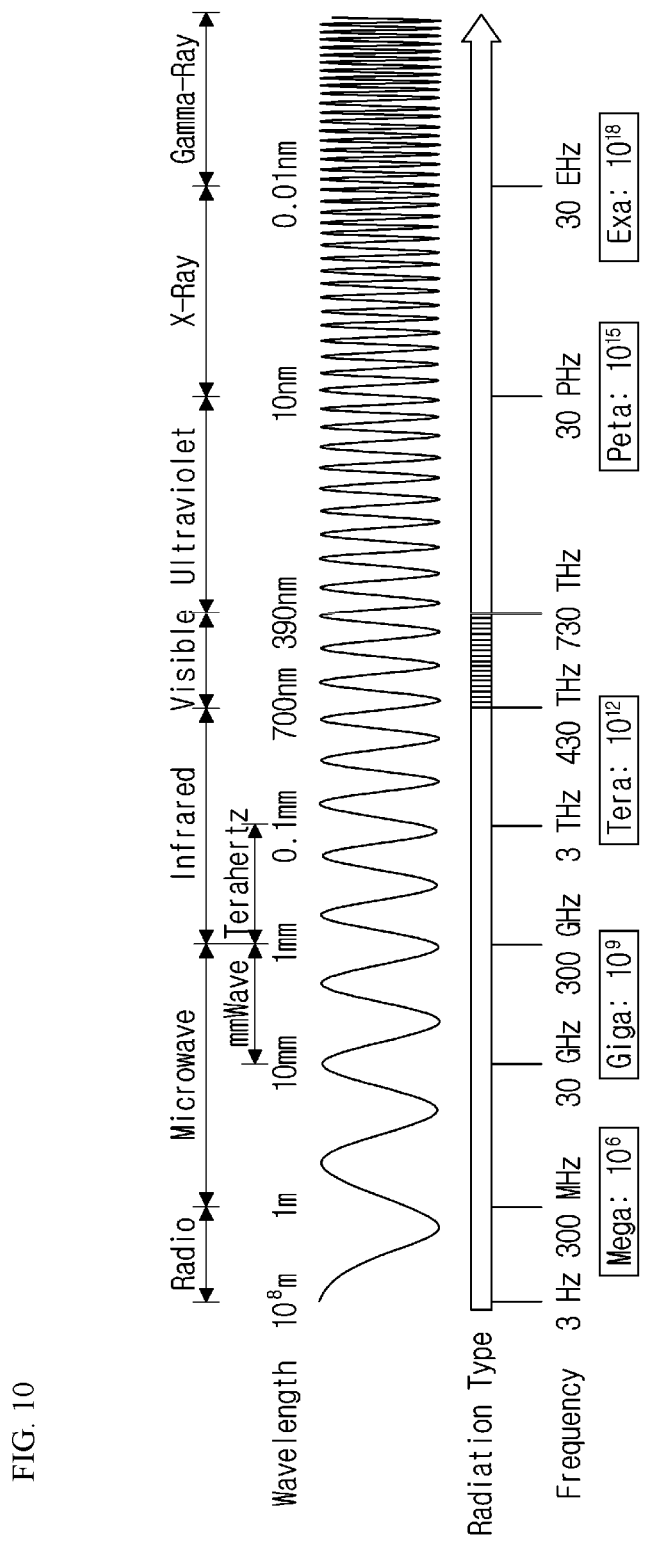
FIG. 10 is a view showing an electromagnetic spectrum applicable to the present disclosure.

FIG. 10 is a view showing an electromagnetic spectrum applicable to the present disclosure. For example, referring to FIG. 10, THz, waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication.

Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz, band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 11:
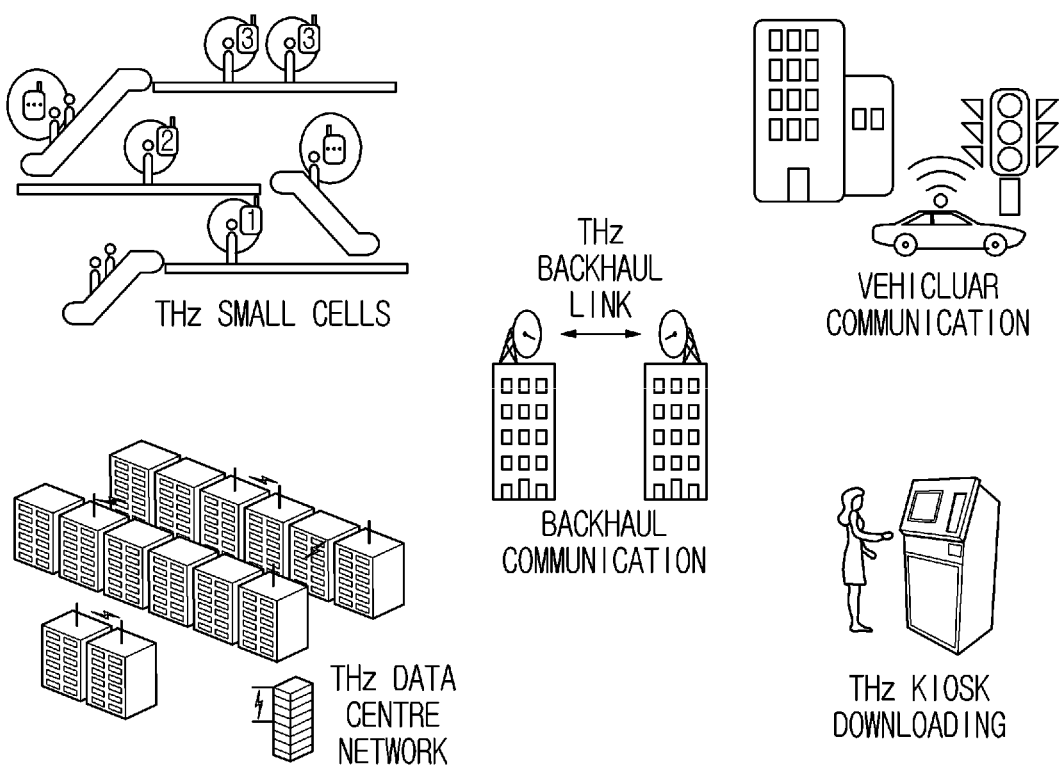
FIG. 11 is a view showing a THz communication method applicable to the present disclosure.

FIG. 11 is a view showing a THz communication method applicable to the present disclosure.

Referring to FIG. 11, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multipoint connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 12:
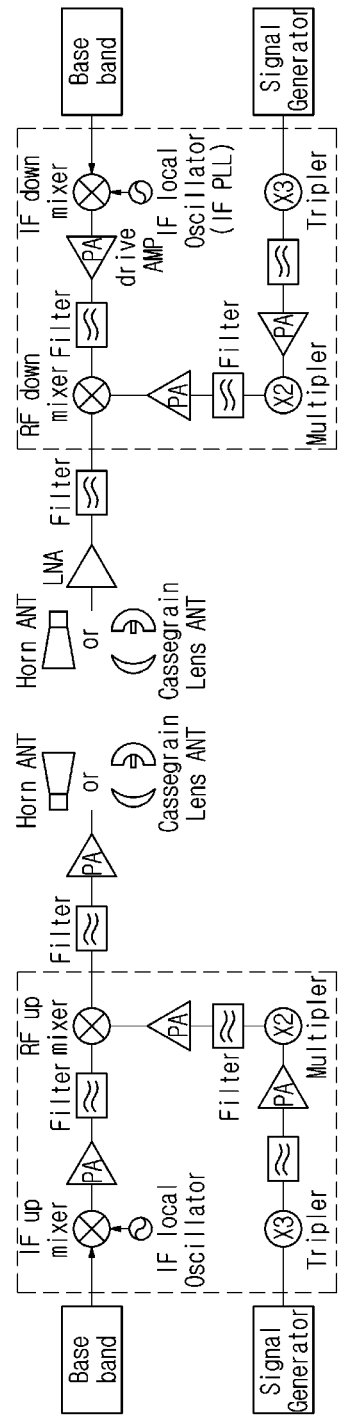
FIG. 12 is a view showing a THz wireless communication transceiver applicable to the present disclosure.

FIG. 12 is a view showing a THz wireless communication transceiver applicable to the present disclosure.

Referring to FIG. 12, THz wireless communication may be classified based on the method of generating and receiving THz. The THz generation method may be classified as an optical device or electronic device based technology.

At this time, the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 12, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 12. In FIG. 12, IF represents an intermediate frequency, a tripler and a multiplier represents a multiplier, PA represents a power amplifier, and LNA represents a low noise amplifier, and PLL represents a phase-locked loop.

Figure 13:
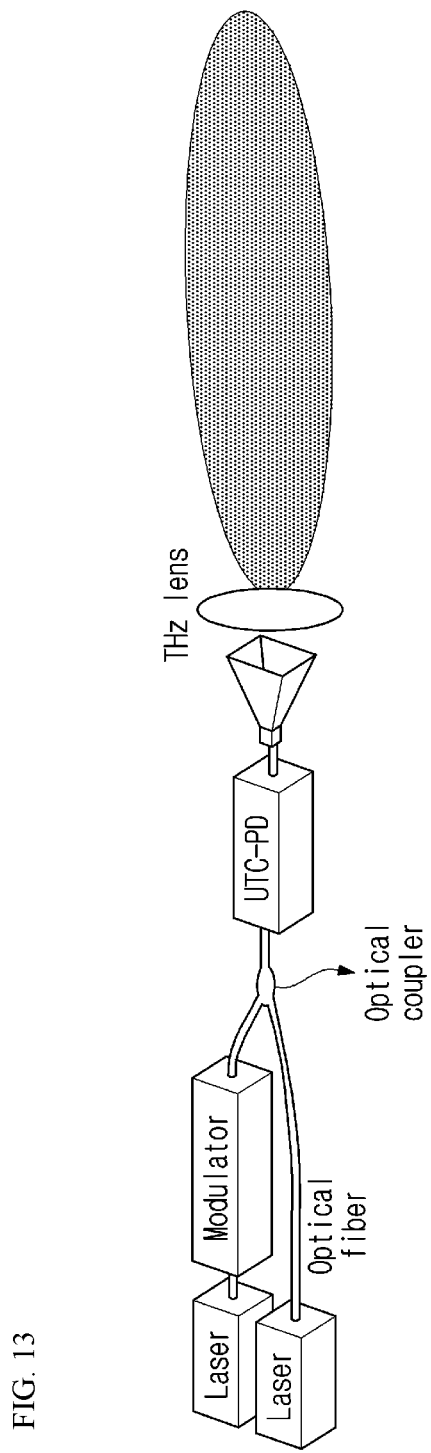
FIG. 13 is a view showing a signal generation method applicable to the present disclosure.
Figure 14:
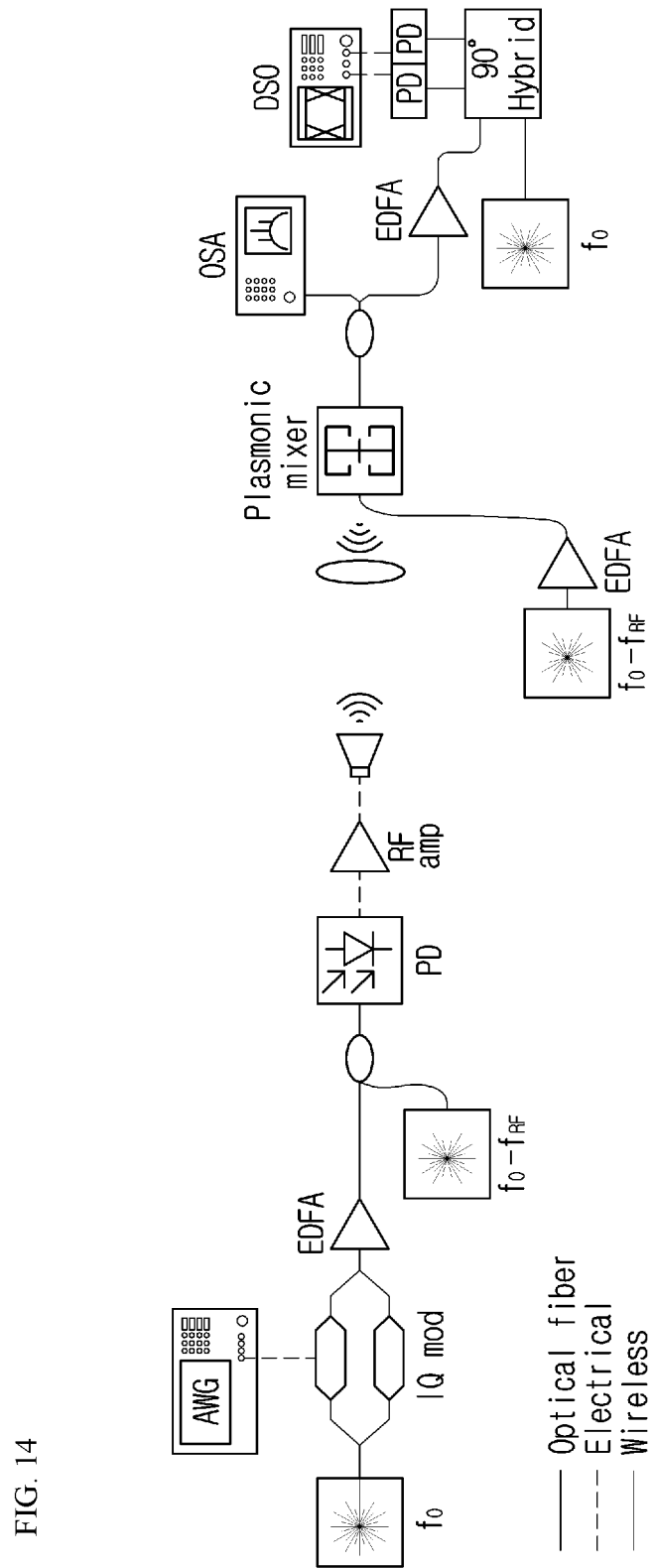
FIG. 14 is a view showing a wireless communication transceiver applicable to the present disclosure.

FIG. 13 is a view showing a THz signal generation method applicable to the present disclosure. FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions photoelectric conversion, electrophonic conversion, etc.) are modularized as one component, and DSO represents a digital storage oscilloscope.

Figure 15:
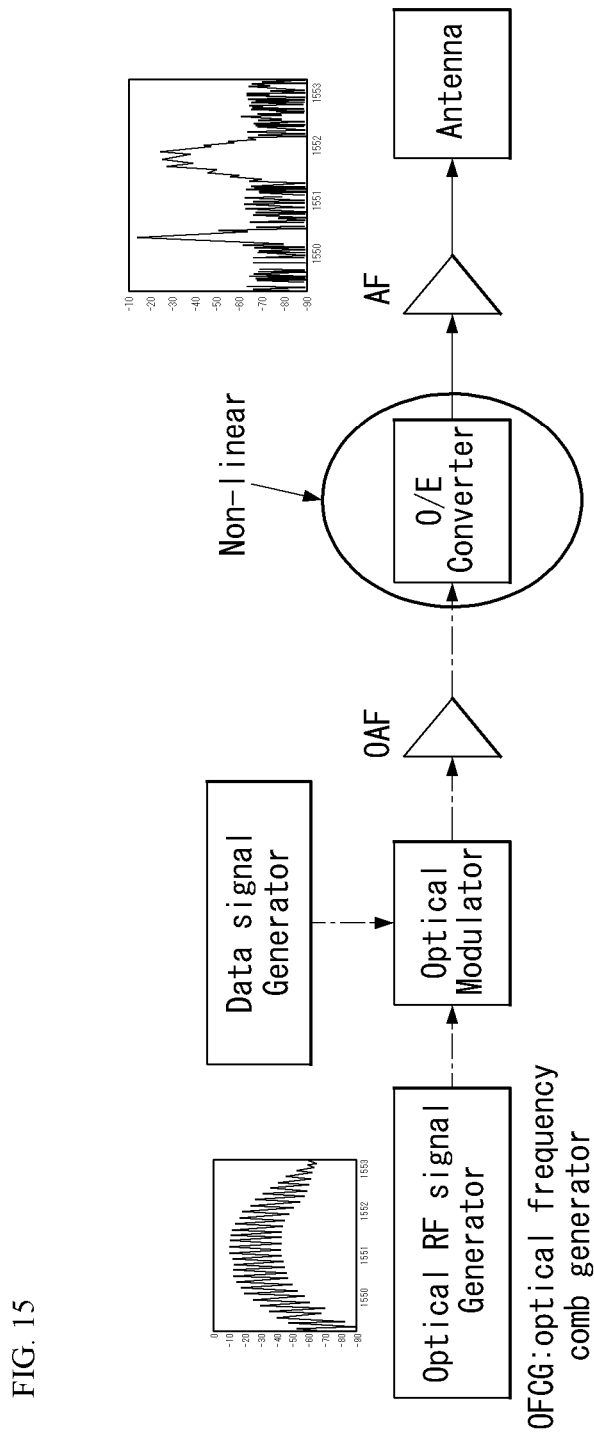
FIG. 15 is a view showing a transmitter structure applicable to the present disclosure.
Figure 16:
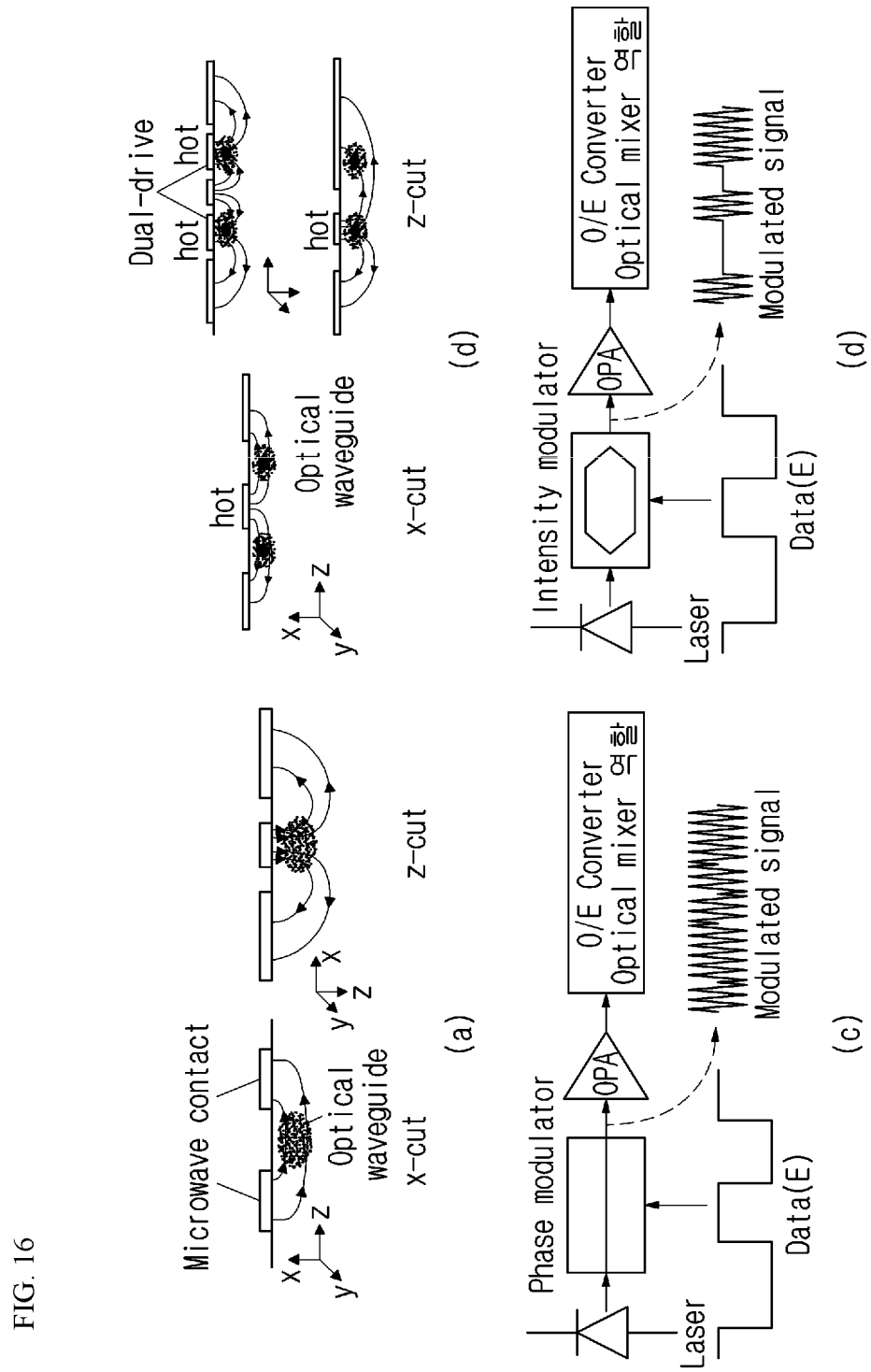
FIG. 16 is a view showing a modulator structure applicable to the present disclosure.

FIG. 15 is a view showing a transmitter structure applicable to the present disclosure. FIG. 16 is a view showing a modulator structure applicable to the present disclosure.

Referring to FIGS. 15 and 16, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to Pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation $10^{\wedge 2}$ db/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent, in this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Here, wireless communication technology implemented in the wireless devices 200a and 200b of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 200a and 200b of the present disclosure may include at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

<Contents Related to the Present Disclosure>

The contents described above may be applied in combination with the embodiments proposed in the present disclosure to be described later, or may be supplemented to clarify the technical characteristics of the embodiments proposed in the present disclosure. The embodiments described below are only separated for convenience of description, and some components of one embodiment may be substituted with some components of another embodiment, or may be applied in combination with each other.

Symbols/abbreviations/terms used in relation to embodiments of the present disclosure to be described later are as follows.

AWGN: Additive White Gaussian Noise
CP: Cyclic Prefix
CS: Cyclic Shift
DFT-s-OFDM: Discrete Fourier Transform-Spread-Orthogonal Frequency Division Multiplexing
DL: Downlink
DAO: Data Allocation Offset
FDE: Frequency Domain Equalization
FDMA: frequency division multiple access
ICI: Inter-Carrier Interference
OFDM: Orthogonal Frequency Division Multiplexing
RE: Resource Element
RB: Resource Block
SCS: Sub Carrier Spacing
SPS: Semi Persistent Scheduling
THz: Terahertz
UL: Uplink
PTRS: Phase Tracking Reference Signal Hereinafter, technical problems to be solved through the embodiments of the present disclosure will be described.

LTE/LTE-A uses CP-OFDM (Cyclic Prefix based Orthogonal Frequency Division Multiplexing) in downlink and DFT-s-OFDM (Discrete Fourier Transform spread Orthogonal Frequency Division Multiplexing) in uplink, as an access method. DFT-s-OFDM is better known by the name SC-FDMA (Single Carrier Frequency Division Multiple Access). 5G NR also uses CP-OFDM as an access method and also supports CP-OFDM in uplink, unlike LTE. DFT-s-OFDM is still valid as an access method in the uplink of 5G NR, and all devices supporting 5G NR may necessarily support DFT-s-OFDM. A network may determine an access method to be used for uplink among CP-OFDM and DFT-s-OFDM.

When CP-OFDM is used in a frequency band corresponding to FR2 of 5G NR and/or a frequency band corresponding to THz band of 6G, PAPR (Peak-to-Average Power Ratio) may increase. Accordingly, discussions are underway to use DFT-s-OFDM with a relatively low PARP as a downlink access method.

In order to apply DFT-s-OFDM to downlink, multiple access for a plurality of UEs should be supported. Multiple access schemes using DFT-s-OFDM include schemes using TDMA and FDMA.

Figure 17:
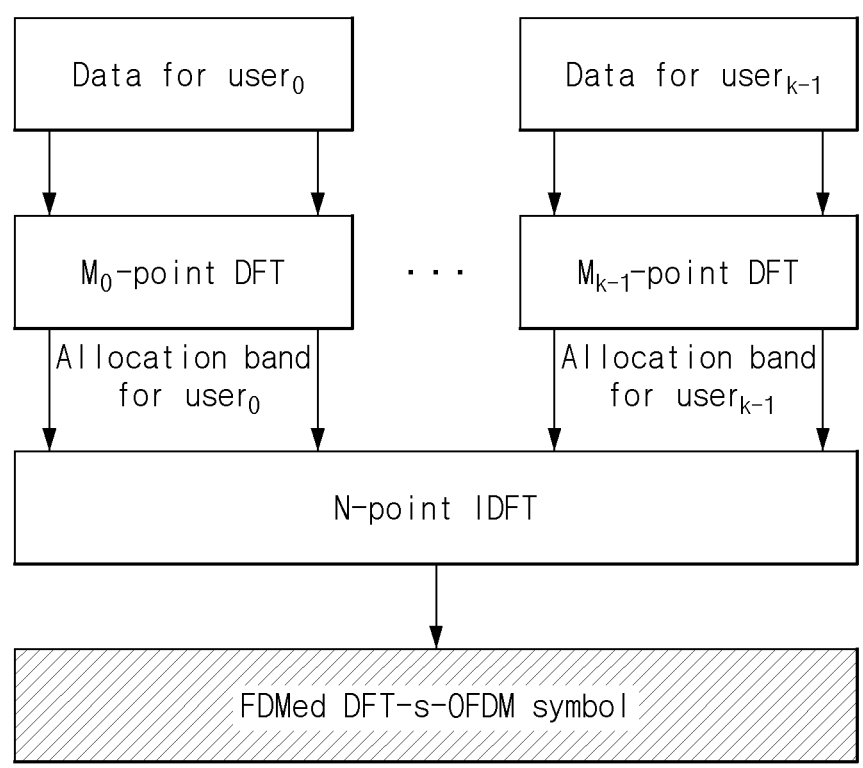
FIG. 17 is a conceptual diagram illustrating FDMA among multiple access schemes using DFT-s-OFDM applicable to the present disclosure.

FIG. 17 is a conceptual diagram illustrating FDMA among multiple access schemes using DFT-s-OFDM applicable to the present disclosure.

Among multiple access schemes using DFT-s-OFDM, FDMA may be more efficient than TDMA in terms of spectrum and/or time delay. Referring to FIG. 17, first, $M_0$-point ... $M_{k-1}$-point DFT is performed on data for each user (data for user 0 ... data for user k–1 in FIG. 17), and frequency resources may be allocated to each user. Thereafter, N-point IDFT (Inverse DFT) is performed, and a finally FDM DFT-s-OFDM symbol may be generated.

Figure 18:
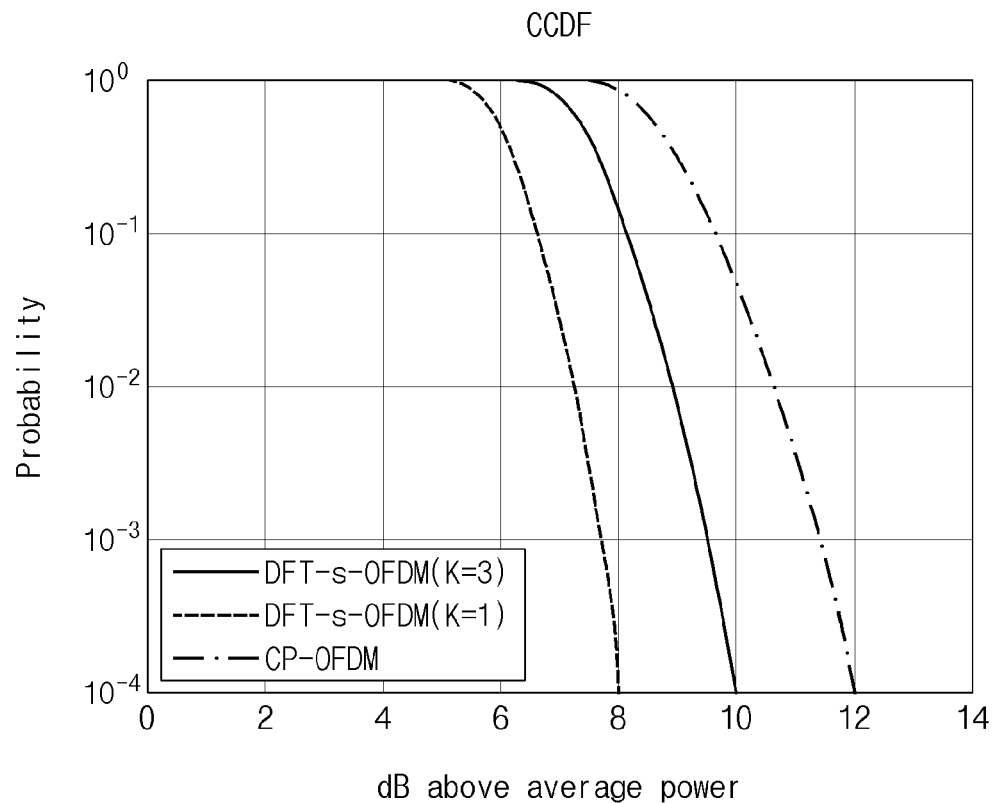
FIG. 18 is a graph illustrating PAPR when FDMA is used among multiple access schemes using DFT-s-OFDM applicable to the present disclosure.

FIG. 18 is a graph illustrating PAPR in the case of using FDMA, among multiple access schemes using DFT-s-OFDM applicable to the present disclosure.

FIG. 18 shows PAPR in the case of using DFT-s-OFDM as an access method when the number of FDMed UEs is 1 and in the case of using DFT-s-OFDM as an access method when the number of FDMed. UEs is 3. In addition, in FIG. 9, the size of the IFFT may be 1024, a total data size may be 1020, and a modulation order may be quadrature phase shift keying (QPSK).

Referring to FIG. 18, when multiple access is performed by FDMA using DFT-s-OFDM, as the number of UEs increases, the signal power of each UE overlaps at the same time, resulting in an increase in PAPR, approaching PAPR of the CP-OFDM access method. Therefore, a separate technique for applying DFT-s-OFDM to downlink may be required to effectively reduce the PAPR.

Figure 19:
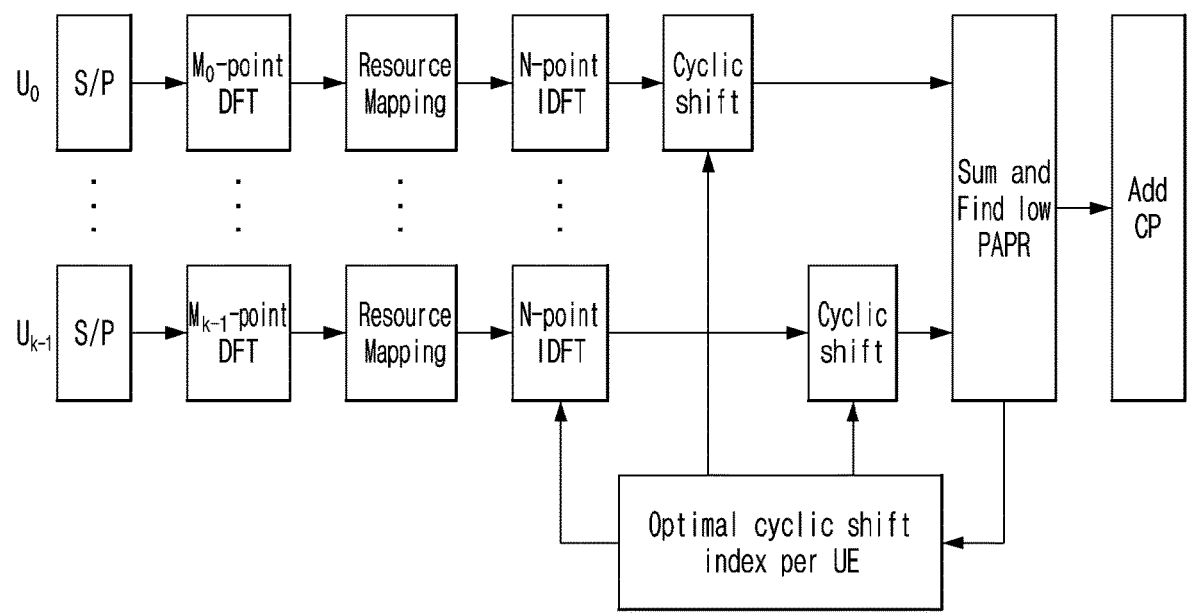
FIG. 19 is a conceptual diagram illustrating a method performed by a base station (BS) applicable to the present disclosure.
Figure 20:
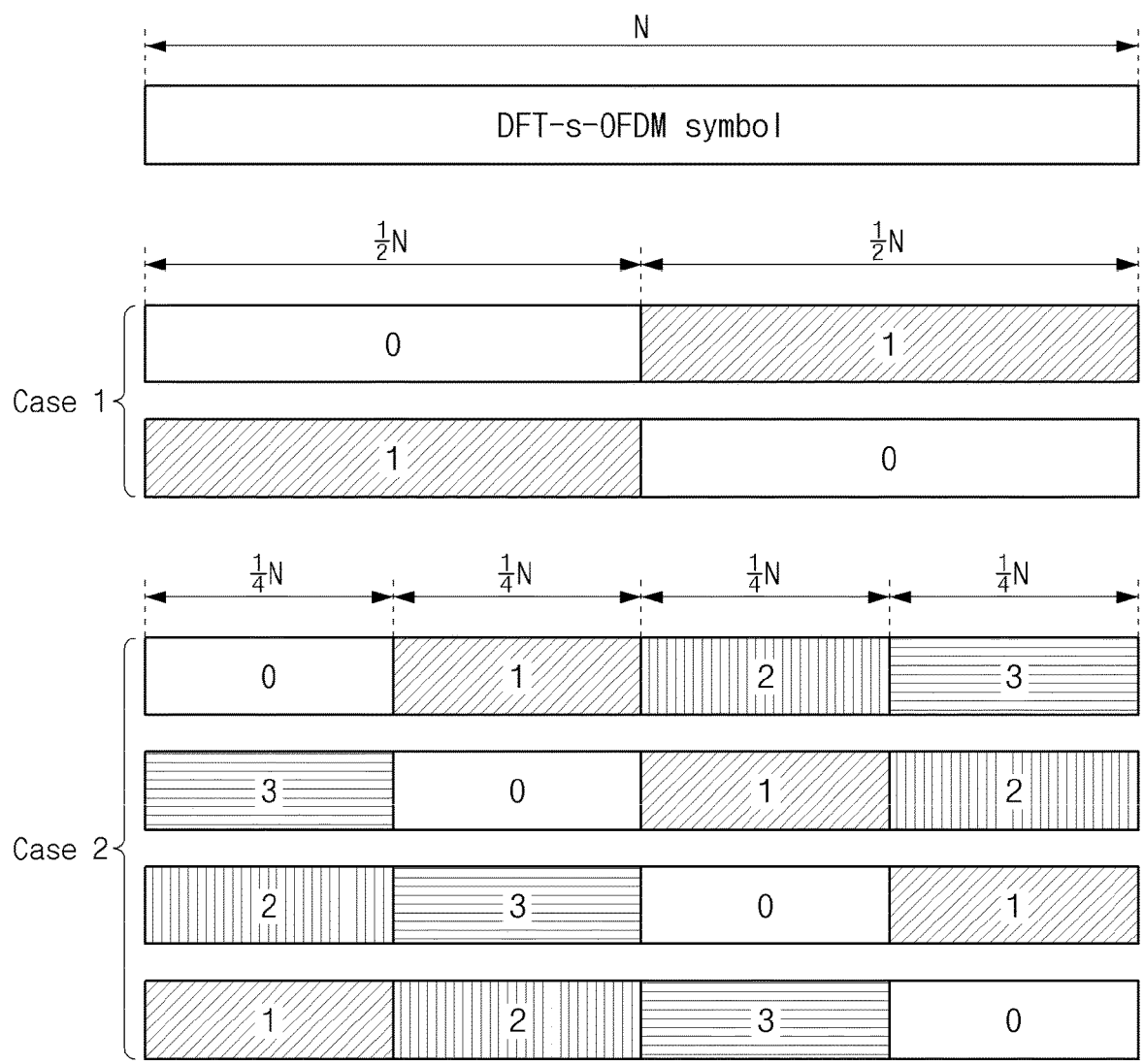
FIG. 20 is a conceptual diagram illustrating a method of determining a cyclic shift index applicable to the present disclosure.

FIG. 19 is a conceptual diagram illustrating a method performed by a base station (BS) applicable to the present disclosure. FIG. 20 is a conceptual diagram illustrating a method of determining a cyclic shift index applicable to the present disclosure.

Referring to FIGS. 19 and 20, the BS may perform DFT (DFT($M_0$-point to $M_{k-1}$-point DFT) on data ($V_0$ to $V_{k-1}$) for each UE. Here, data may be each mapped to time resources (e.g., symbols) for a plurality of UEs. Here, the BS may map each data on which DFT is performed to a resource. Here, the resource may be a frequency resource. The BS may generate symbols for each UE by performing IDFT (N-point IDFT) on each data mapped to the resource. The BS may apply a cyclic shift to symbols for each UE. The BS may generate a DFT-s-OFDM symbol by summing symbols to which each cyclic shift is applied. The BS may generate a downlink signal by adding a CP to the DFT-s-OFDM symbol. Here, the cyclic shift may be a value that minimizes the PAPR of the DFT-s-OFDM symbol, and may be indicated by the cyclic shift index.

The BS may obtain a cyclic shift index by performing an operation on PAPR based on the cyclic shift interval. Here, the cyclic shift index may be determined based on the number (the number of UEs to which the BS intends to transmit data) of UEs multiplexed to FDMA from DFT-s-OFDM and the DFT-s-OFDM symbol.

The BS may calculate a peak-to-average power ratio (PAPR) according to a cyclic shift index of a symbol for each UE. Here, the cyclic shift index may be determined based on the cyclic shift interval. Referring to FIG. 20, when the cyclic shift interval is ½ (case 1), the cyclic shift index may be 0 or 1. The BS may obtain the PAPR of the symbol for the UE for each cyclic shift index. When the cyclic shift interval is ¼ (case 2), the cyclic shift index may be 0, 1, 2, or 3. The BS may obtain the PAPR of the symbol for each cyclic shift index.

When the number of UEs multiplexed from DFT-s-OFDM to FDMA is K and the cyclic shift interval is 1/L, the BS may perform PAPR operation $K^L$ times. The BS may obtain a cyclic shift index for each UE that minimizes the PAPR of the DFT-s-OFDM symbol based on the result of performing the operation.

Figure 21:
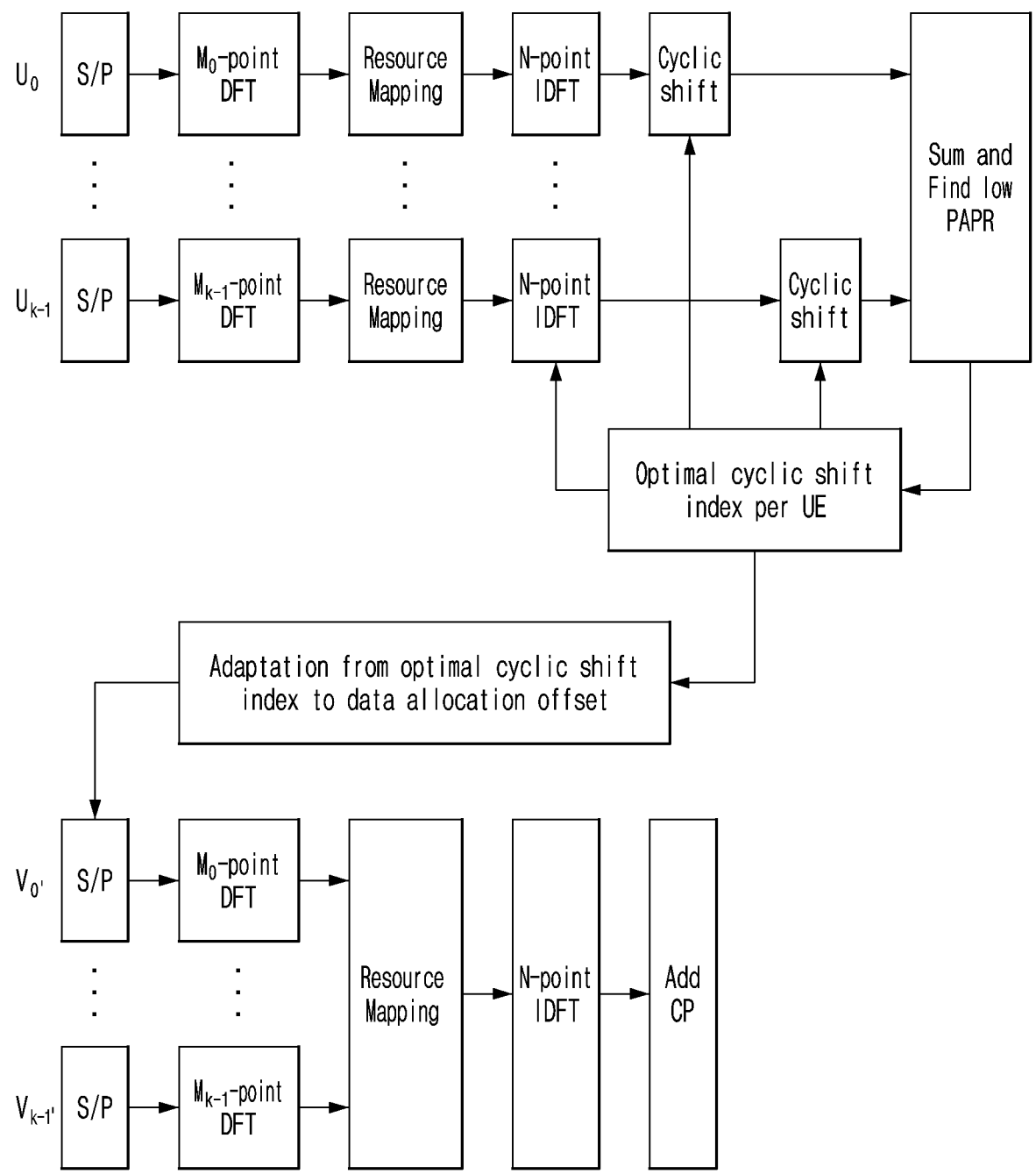
FIG. 21 is a conceptual diagram illustrating a method performed by a BS applicable to the present disclosure.
Figure 22:
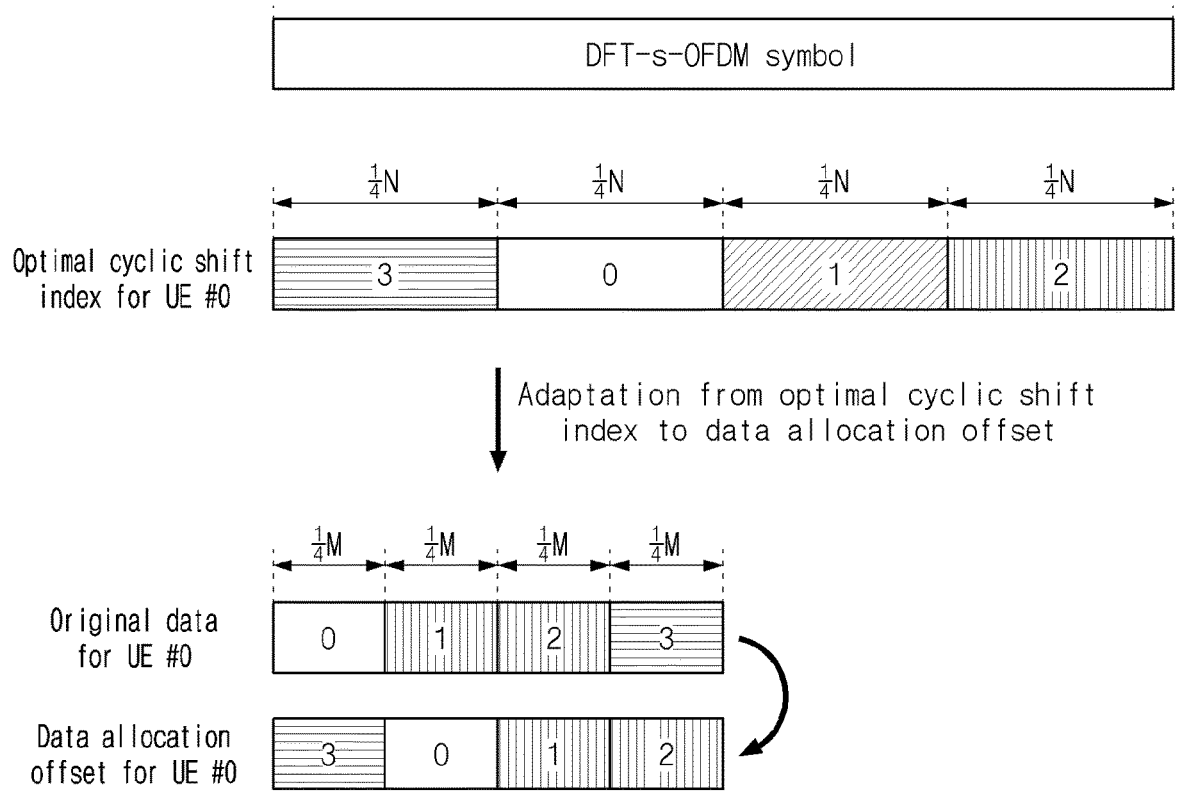
FIG. 22 is a conceptual diagram illustrating a data allocation offset applicable to the specification.

FIG. 21 is a conceptual diagram illustrating a method performed by a BS applicable to the present disclosure. FIG. 22 is a conceptual diagram illustrating a data allocation offset applicable to the present disclosure.

Referring to FIG. 21, the BS may perform DFT ($M_0$-point to $M_{k-1}$-point DFT) on first data ($V_0$ to $V_{k-1}$) for each UE. Here, the first data for each UE may be mapped to a time resource for each UE. The BS may generate a first symbol for each UE by mapping each first data on which DFT is performed to a resource and performing N-point IDFT (IDFT). The BS may apply a cyclic shift to symbols for each UE. The BS may generate a first DFT-s-OFDM symbol by summing, the symbols to which each cyclic shift is applied. In addition, the BS may obtain a cyclic shift index that minimizes the PAPR of the first DFT-s-OFDM symbol. Here, the cyclic shift index may be obtained in the same manner as that described in FIGS. 19 to 20.

The BS may apply a data allocation offset to the second data ($V_0'$ to $V_{k-1}'$) for each UE. Here, the data allocation offset may be indicated based on the cyclic shift index. The BS may perform DFT ($M_0$-point to $M_{k-1}$-point DFT) on the second data to which the data allocation offset is applied. The BS may generate a second symbol for each UE by mapping each of the second data on which the DFT is performed to a resource and performing an N-point IDFT (IDFT). The BS may generate a second DFT-s-OFDM symbol by summing the second symbols for each UE. The BS may generate a downlink signal by adding a CP to the second DFT-s-OFDM symbol.

Referring to FIG. 22, for example, when the data allocation offset is applied by the above method, the cyclic shift index of UE #0 may be changed from 0 (0, 1, 2, 3) to 3 (3, 0, 1), 2).

Figure 23:
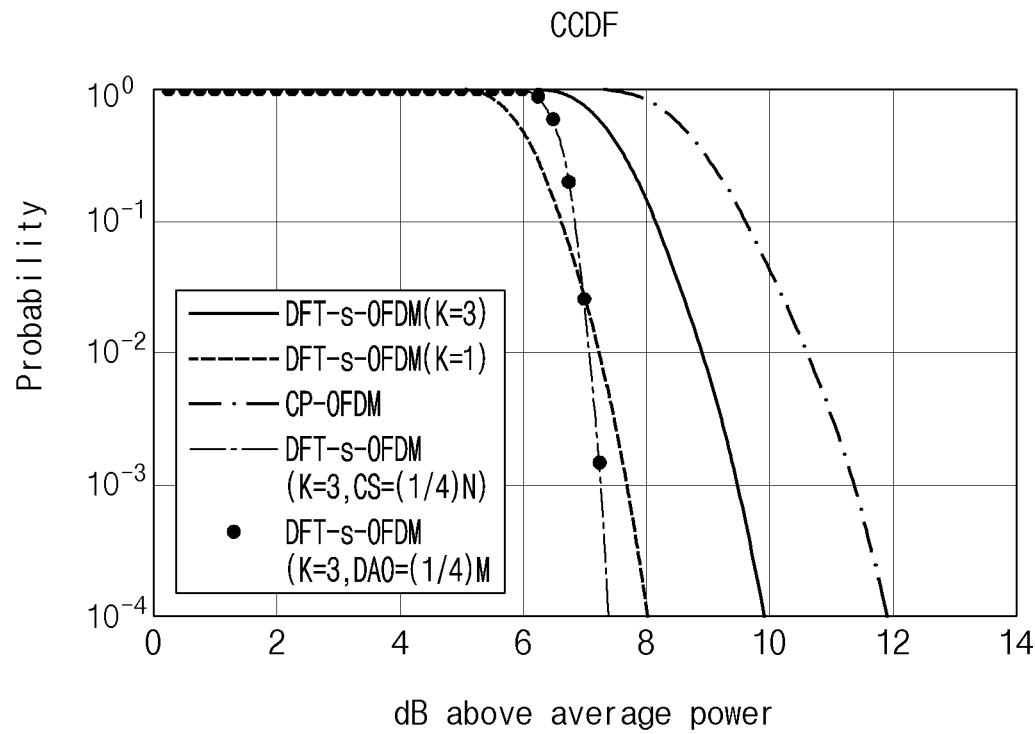
FIG. 23 is a graph illustrating PAPR when a cyclic shift applicable to the present disclosure is applied.

FIG. 23 is a graph illustrating PAPR when a cyclic shift applicable to the present disclosure is applied.

FIG. 23 illustrates PAPRs in the case of using CP-OFDM as an access method, in the case of using DFT-s-OFDM as an access method when the number of FDMed UEs is 1 (cyclic shift is not applied), in the case of using DFT-s-OFDM as an access method when the number of FDMed UEs is 3 (cyclic shift is not applied), in the case of using DFT-s-OFDM as an access method when the number of FDMed UEs is 3 (cyclic shift interval is ¼), and in the case of using DFT-s-OFDM as an access method when the number of FDMed UEs is 3 (size of a data allocation offset is ¼). In addition, in FIG. 23, the IDFT size (N) may be 1024, the FFT size (M) may be 340, a total data size may be 1020, and a modulation order may be QPSK.

Referring to FIG. 23, it can be seen that PAPR is reduced when cyclic shift is applied compared to when cyclic shift is not applied. In addition, it can be seen that the PAPR is equally reduced when the size of the cyclic shift is the same as the size of the data allocation offset or when the ratio of the size of the cyclic shift and the size of the data allocation offset is the same.

In the terahertz band, it is necessary to compensate for phase noise caused by radio frequency (RF) impairment in addition to the above PAPR problem. When uplink transmission is performed using DFT-s-OFDM in 5G NR, a phase tracking reference signal is added to a symbol as a method for compensating for phase noise. Meanwhile, the phase tracking reference signal configuration may be determined according to the number of phase tracking reference signal groups and phase tracking reference signal samples. The number of phase tracking reference signal groups and phase tracking reference signal samples may be determined based on Table 6 below.

TABLE 6

| Scheduled bandwidth | Number of PTRS groups | Number of samples per PTRS group |
|---|---|---|
| $N_{RB0} \leq N_{RB} < N_{RB1}$ | 2 | 2 |
| $N_{RB1} \leq N_{RB} < N_{RB2}$ | 2 | 4 |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

Here, $N_{RB}$ may be a value received by the BS through PTRS-UplinkConfig of an RRC message. The phase tracking reference signal configuration according to the number of phase tracking reference signal groups and the number of phase tracking reference signal samples of the BS may be as shown in Table 7 below.

Mapping of the phase tracking reference signal based on Table 7 may be performed as follows.

Figure 24:
FIG. 24 is a conceptual diagram illustrating a configuration of a phase tracking reference signal applicable to the present disclosure.
Figure 24:
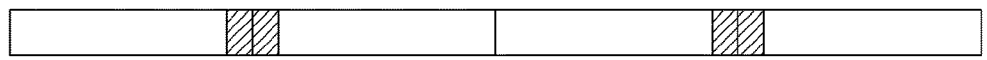
Figure 24:
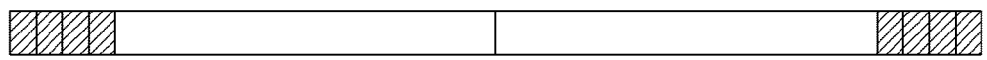
Figure 24:
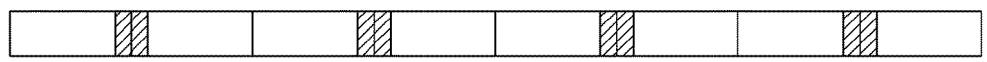
Figure 24:
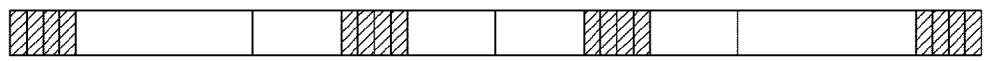
Figure 24:
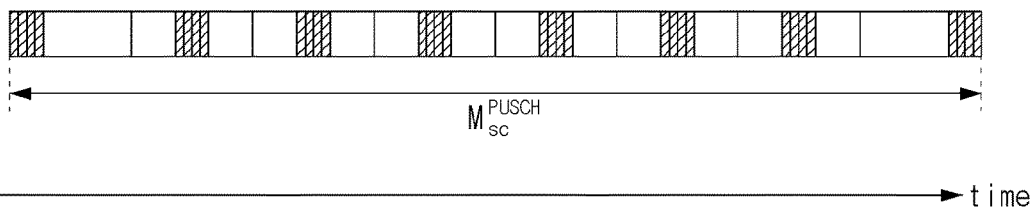

FIG. 24 is a conceptual diagram illustrating a configuration of a phase tracking reference signal applicable to the present disclosure.

Referring to FIG. 24, an example of a phase tracking reference signal configuration of case #0 (when the number of phase tracking reference signal groups is 2 and the number of phase tracking reference signal samples is 2), case #1 (the number of phase tracking reference signal groups is 2 and the number of phase tracking reference signals is 2), case #2 (when the number of phase tracking reference signal groups is 4 and the number of phase tracking reference signal samples is 2), case #3 (when the number of phase tracking reference signal groups is 4 and phase tracking reference signal samples is 4, and case #4 (when the number of phase tracking reference signal groups is 8 and the number of phase tracking reference signal samples is 4). As for the phase tracking reference signal configuration, the phase tracking reference signals may be configured symmetrically as in case #0 and case #2, and the phase tracking reference signals may be configured asymmetrically as in case #1, case #3, and case #4.

The phase tracking reference signal configuration is currently used in 5G NR and may be applied in the terahertz band. When the phase tracking reference signal configuration is used in the terahertz band, the method of reducing PAPR in DFT-s-OFDM described above may be used together. That is, in the phase tracking reference signal configuration as described above, a cyclic shift may be applied in units of DFT-s-OFDM symbols/N. When the phase tracking reference signals are configured symmetrically as in case #0 and case #2, distortion may not occur in the phase tracking reference signal configuration even if the cyclic shift is applied in units of the phase tracking reference signal group, but when the phase tracking reference signal is not configured symmetrically as in case #1, case #3 and case #4, distortion may occur in the phase tracking reference signal configuration even if the cyclic shift is applied in units of the phase tracking reference signal group.

TABLE 7

| Number of PTRS groups $N_{group}^{PT-RS}$ | Number of samples per PTRS group $N_{samp}^{group}$ | Index m of PTRS samples in OFDM symbol l prior to transform precoding $M_{sc}^{PUSCH} = M_{RB}^{PUSCH} \cdot N_{sc}^{RB}$ $M_{RB}^{PUSCH}$ represents the bandwidth of the PUSCH in terms of resource blocks |
|---|---|---|
| 2 | 2 | $s \lfloor M_{sc}^{PUSCH}/4 \rfloor + k - 1$ where $s = 1, 3$ and $k = 0, 1$ |
| 2 | 4 | $sM_{sc}^{PUSCH} + k$ where $\begin{cases} s = 0 \text{ and } k = 0, 1, 2, 3 \\ s = 1 \text{ and } k = -4, -3, -2, -1 \end{cases}$ |
| 4 | 2 | $\lfloor sM_{sc}^{PUSCH}/8 \rfloor + k - 1$ where $s = 1, 3, 5, 7$ and $k = 0, 1$ |
| 4 | 4 | $sM_{sc}^{PUSCH}/4 + n + k$ where $\begin{cases} s = 0 & \text{and } k = 0, 1, 2, 3 & n = 0 \\ s = 1, 2 & \text{and } k = -2, -1, 0, 1 & n = \lfloor M_{sc}^{PUSCH}/8 \rfloor \\ s = 4 & \text{and } k = -4, -3, -2, -1 & n = 0 \end{cases}$ |
| 8 | 4 | $\lfloor sM_{sc}^{PUSCH}/8 \rfloor + n + k$ where $\begin{cases} s = 0 & \text{and } k = 0, 1, 2, 3 & n = 0 \\ s = 1, 2, 3, 4, 5, 6 & \text{and } k = -2, -1, 0, 1 & n = \lfloor M_{sc}^{PUSCH}/16 \rfloor \\ s = 8 & \text{and } k = -4, -3, -2, -1 & n = 0 \end{cases}$ |

FIGS. 25 to 28 are conceptual diagrams illustrating a distortion of a phase tracking reference signal configuration applicable to the present disclosure.

FIGS. 25 to 28 are conceptual diagrams illustrating a distortion of the phase tracking reference signal configuration when the phase tracking reference signal is configured as in case #1 of FIG. 24.

The BS may apply a cyclic shift to the phase tracking reference signal configuration by ½ of the DFT-s-OFDM symbol to reduce the PAPR. The BS may apply a cyclic shift to the phase tracking reference signal configuration until the PAPR is minimized.

Figure 25:
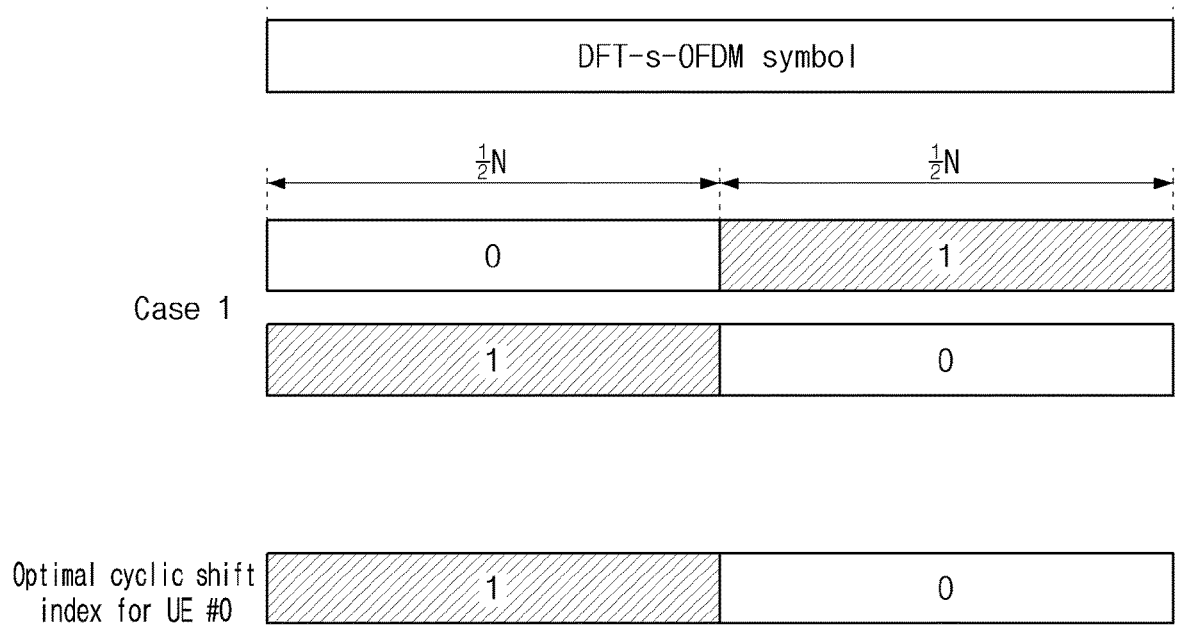
FIGS. 25 to 28 are conceptual diagrams illustrating distortion of a phase tracking reference signal configuration applicable to the present disclosure.
Figure 26:
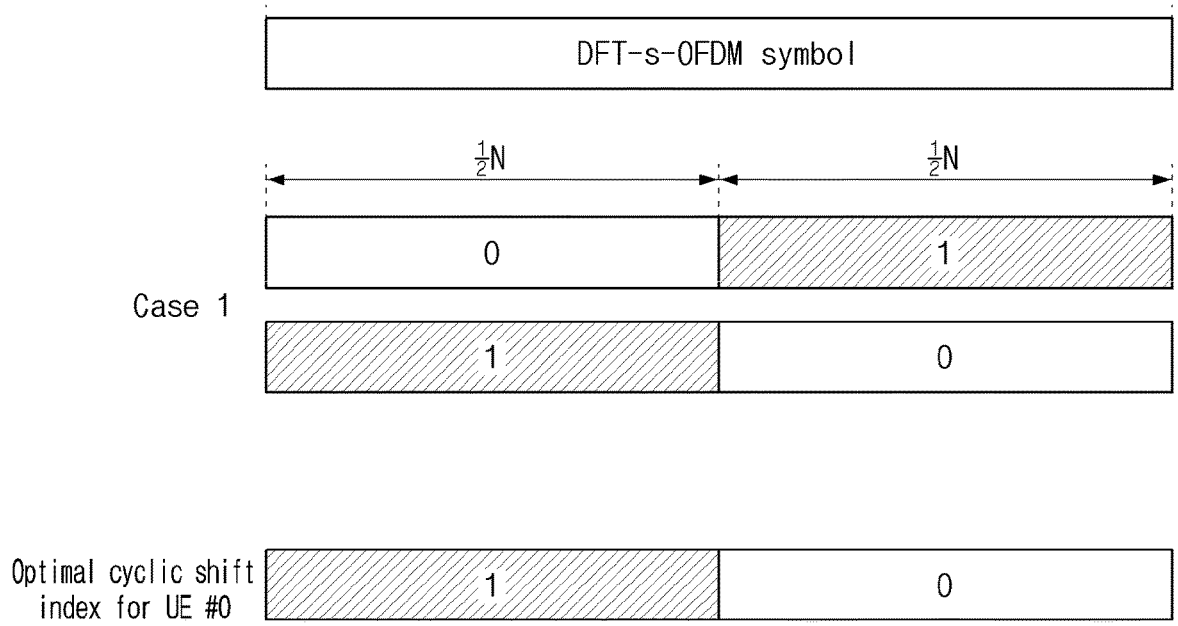
Figure 27:
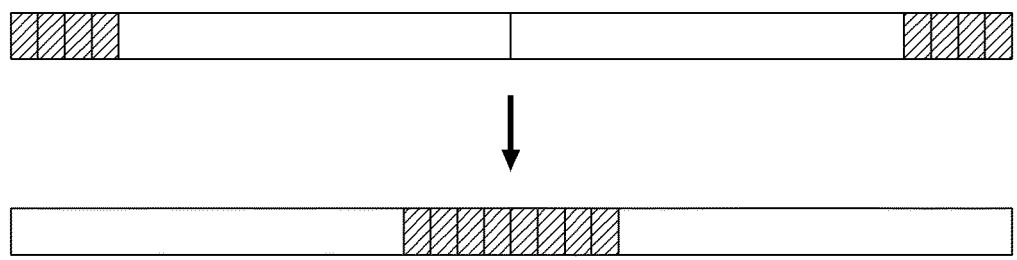

For example, the BS may obtain 1 as a cyclic shift index that minimizes the PAPR as shown in FIG. 25, or may obtain 1 as a data allocation offset index that minimizes the PAPR as shown in FIG. 26. When the cyclic shift index or the data allocation offset index is applied to the phase tracking reference signal configuration in case #1 of FIG. 24, distortion may occur in the phase tracking reference signal configuration as shown in FIG. 27.

Figure 28:
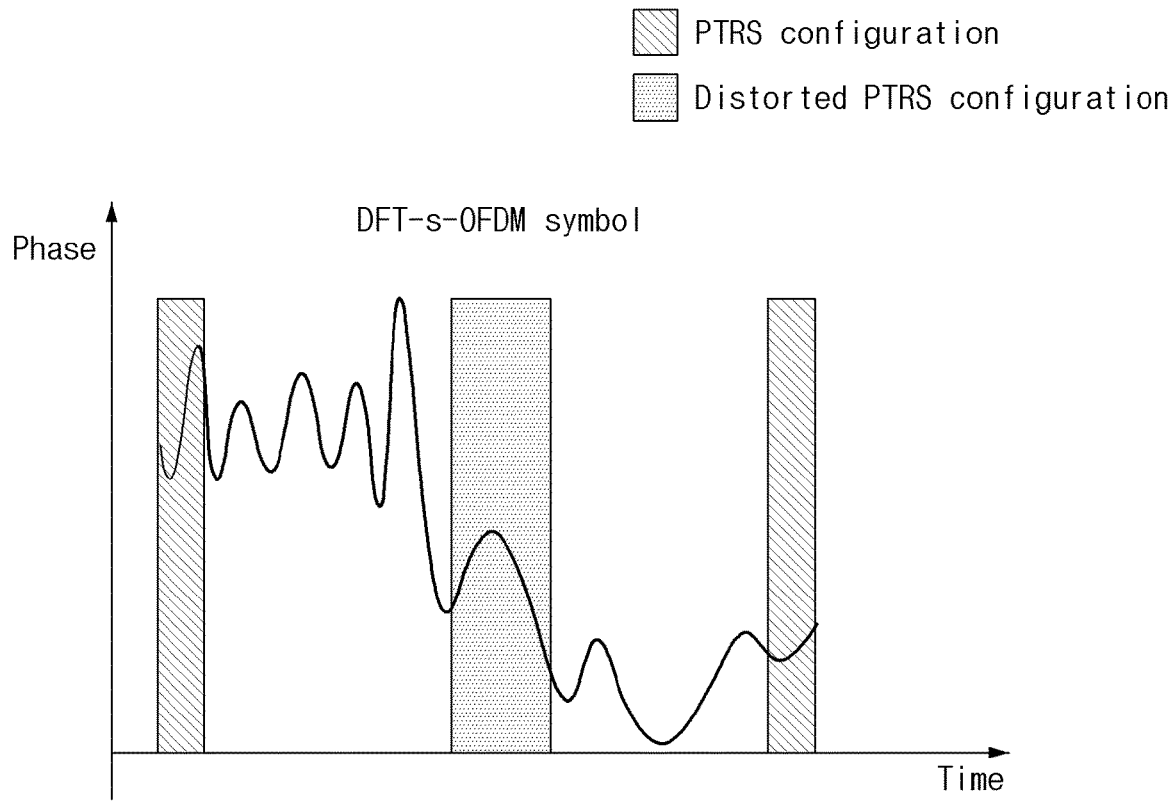

When distortion occurs in the configuration of the phase tracking reference signal, it may not be possible to compensate for phase noise caused by RF impairment of a transceiver in the process of transmitting and receiving signals as shown in FIG. 28. That is, when distortion occurs in the phase tracking reference signal configuration, the method of measuring phase noise at both ends of a symbol and compensating for phase noise through interpolation for a time sample therebetween may not be used, resultantly degrading reception performance.

Figure 29:
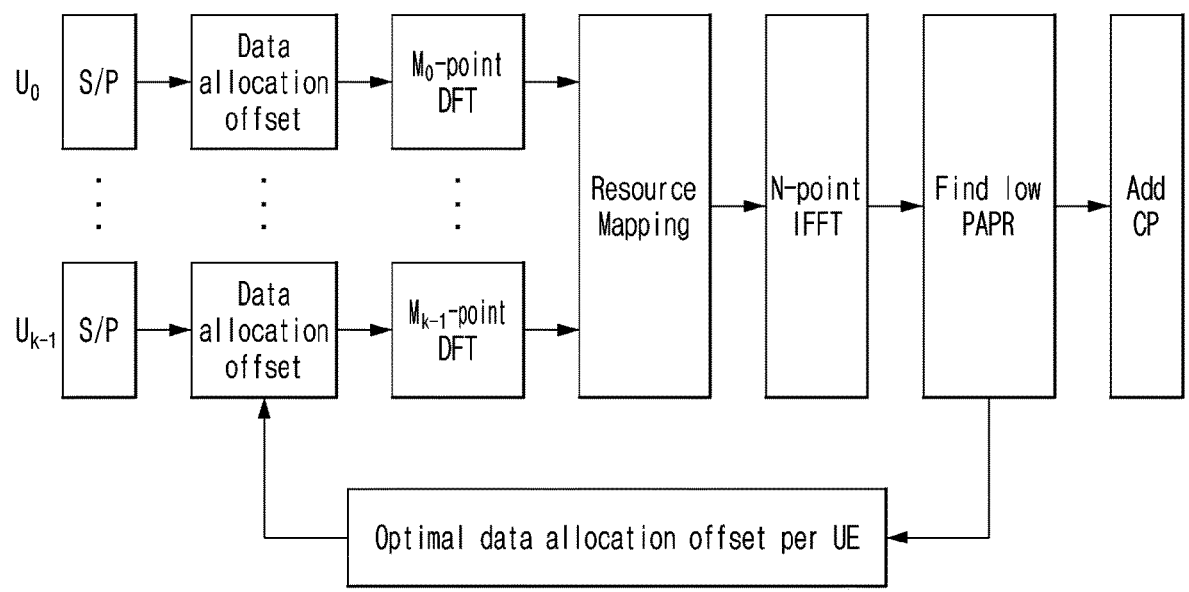
FIG. 29 is a conceptual diagram illustrating a method applicable to the present disclosure.

FIG. 29 is a conceptual diagram illustrating a method applicable to the present disclosure.

Referring to FIG. 29, the BS may apply a data allocation offset to data ($V_0$ to $V_{k-1}$) for each UE. The BS may perform DFT ($M_0$-point to $M_{k-1}$-point DFT) on each data to which the data allocation offset is applied. The BS may map resources to each data on which DFT is performed and performing IFFT (N-point IFFT) to generate a DFT-s-OFDM symbol. The BS may generate a downlink signal by adding a CP to the DFT-s-OFDM symbol. The data allocation offset may be obtained in the following manner.

Figure 30:
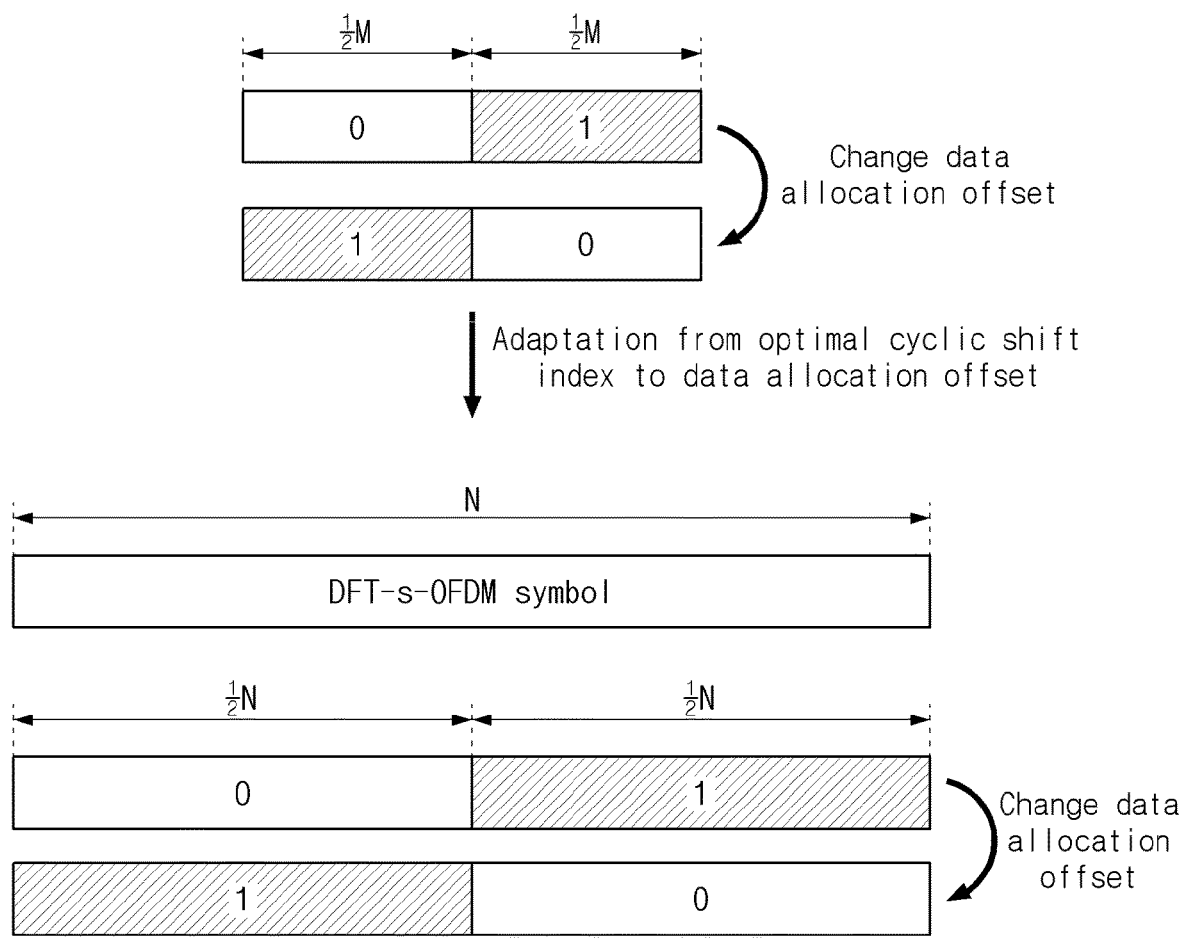
FIG. 30 is a conceptual diagram illustrating a method of obtaining a data offset applicable to the present disclosure.

FIG. 30 is a conceptual diagram illustrating a method of obtaining a data offset applicable to the present disclosure.

Referring to FIG. 30, as described above in FIG. 29, it can be seen that, when a data allocation offset is applied to data for each UE according to a data allocation index 1 and DFT is performed on each data to which the data allocation offset is applied, a cyclic shift is also applied to the -s-OFDM symbol according to the cyclic index 1. Using this characteristic, the BS may obtain a data allocation offset index group that minimizes PAPR for each UE. The number of data allocation offset index group candidates may be equal to or smaller than an integer multiple of the number of phase tracking reference signal groups in consideration of the phase tracking reference signal configuration. The number of data allocation offset index group candidates may be expressed as in Equation 1 below.

$$\alpha N_{DAO} = N_{group}^{PT-RS} \qquad \text{[Equation 1]}$$

Here, $N_{DAO}$ may be the number of data allocation offset index group candidates, $N_{group}^{PT-RS}$ may be the number of phase tracking reference signal groups, and $\alpha$ may be a coefficient for the number of data allocation offset index group candidates and may be a positive integer. As the frequency band increases, the effect of phase noise may increase and the number of phase tracking reference signal groups may increase. Applying a data offset to a symbol for each UE may be as follows.

Figure 31:
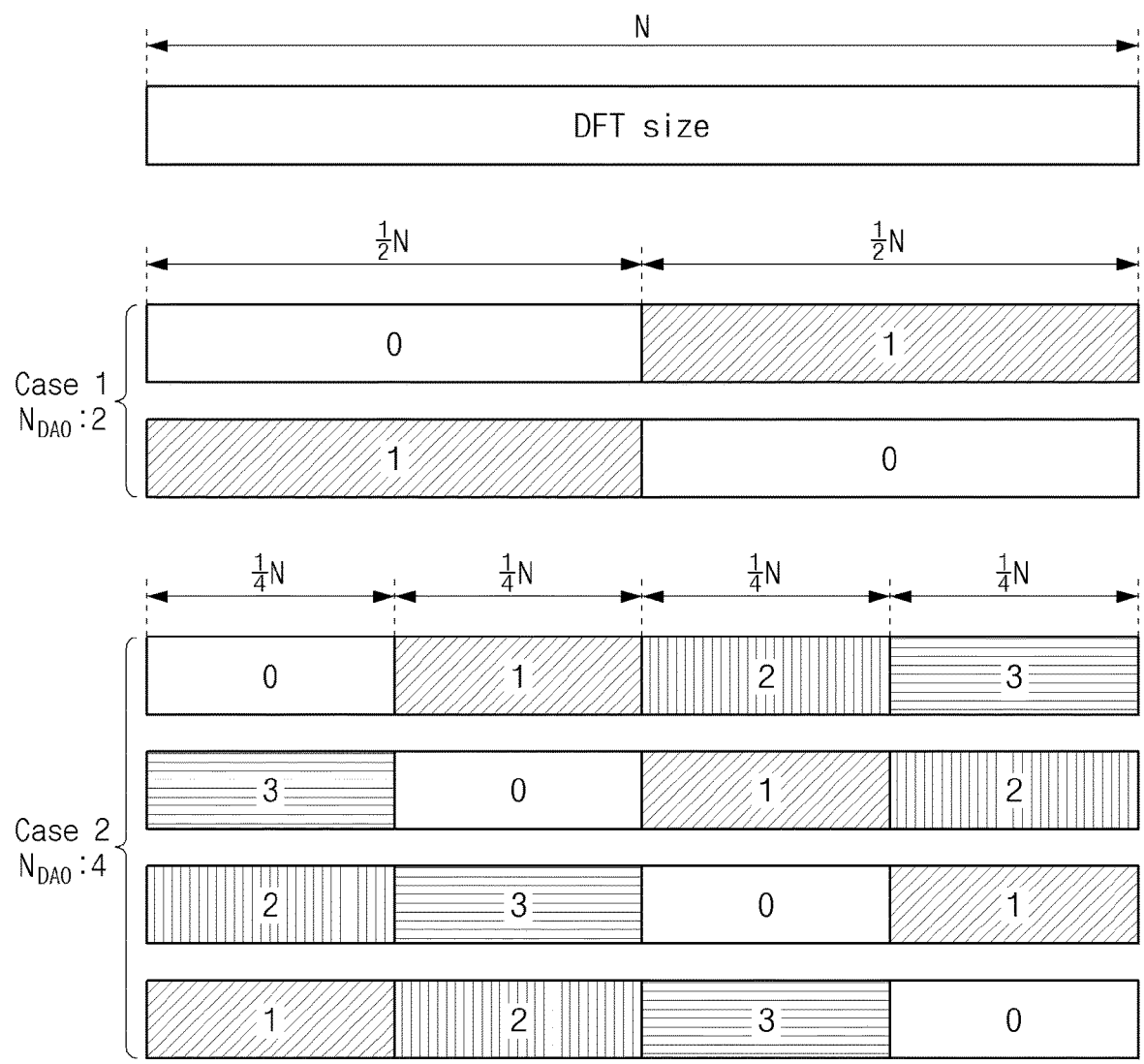
FIG. 31 is a conceptual diagram illustrating an example of applying a data offset applicable to the present disclosure.

FIG. 31 is a conceptual diagram illustrating an example of applying a data offset applicable to the present disclosure.

FIG. 31 shows symbols for a UE of a case 1 of applying a data allocation offset to the symbol for the UE when a size of the symbol for the UE is M and the number $N_{DAO}$ of data allocation offset index group candidates is 2 and a case 2 of applying a data allocation offset to the symbol for the UE when a size of the symbol for the UE is M and the number $N_{DAO}$ of data allocation offset index group candidates is 4. This may have the same result as that of FIG. 20 in which a cyclic shift is applied in the method of FIG. 19.

Figure 32:
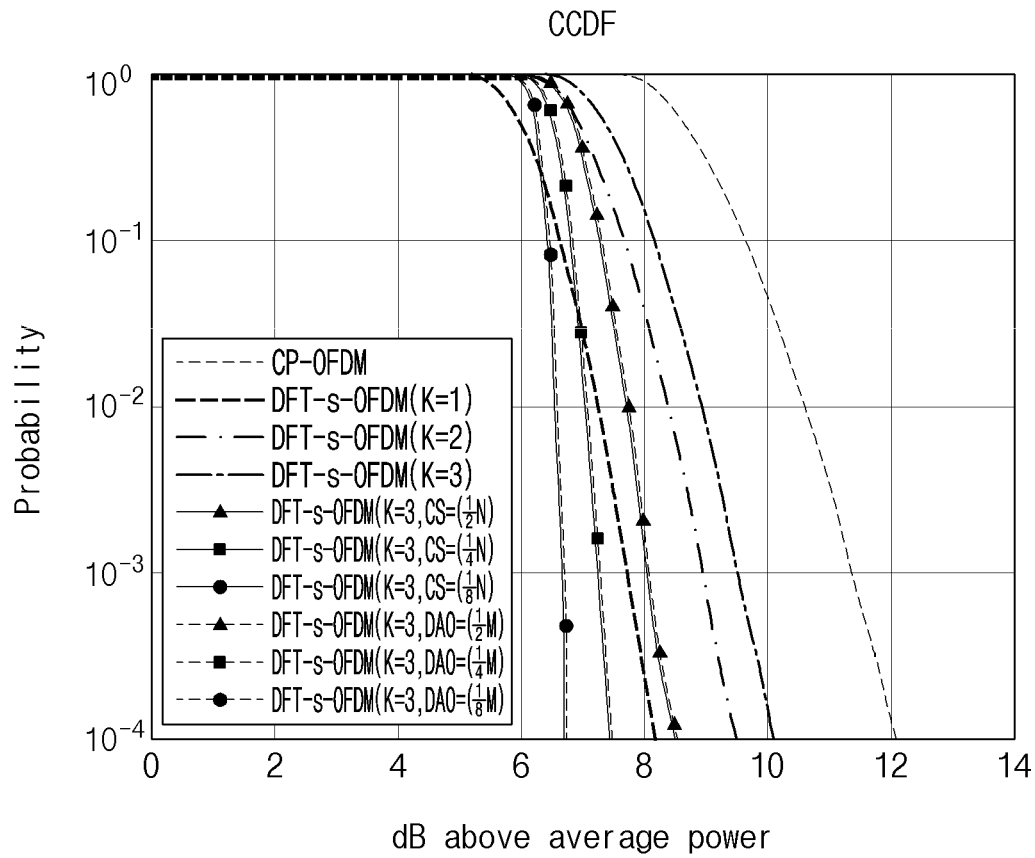
FIG. 32 is a graph showing an effect of applying a data offset applicable to the present disclosure.

FIG. 32 is a graph showing the effect of applying a data offset applicable to the present disclosure.

FIG. 32 is a graph showing PAPRs in the case of using CP-OFDM as an access method, in the case of using DFT-s-OFDM as an access method when the number of FDMed UEs is 1 (cyclic shift is not applied), in the case of using DFT-s-OFDM as an access method when the number of FDMed UEs is 2 (cyclic shift is not applied), in the case of using DFT-s-OFDM as an access method when the number of FDMed UEs is 3 (cyclic shift is not applied), in the case of using DFT-s-OFDM as an access method when the number of FDMed UEs is 3 (cyclic shift is ½), in the case of using DFT-s-OFDM as an access method when the number of FDMed UEs is 3 (cyclic shift is ¼), in the case of using DFT-s-OFDM as an access method when the number of FDMed UEs is 3 (cyclic shift is ⅛), in the case of using DFT-s-OFDM as an access method when the number of FDMed UEs is 3 (size of data allocation offset is ½), in the case of using DFT-s-OFDM as an access method when the number of FDMed UEs is 3 (size of data allocation offset is ¼), and in the case of using DFT-s-OFDM as an access method when the number of FDMed UEs is 3 (size of data allocation offset is ⅛). In addition, in FIG. 32, the M-DFT size may be 192, the N-IFFT size may be 1024, a total data size may be 576, and a modulation order may be QPSK.

Referring to FIG. 32, it can be seen that, when the number of FDMed UEs is the same and DFT-s-OFDM is used as an access method and when the cyclic shift interval and the size of the data allocation offset are the same, the size of the PAPR is the same.

Figure 33:
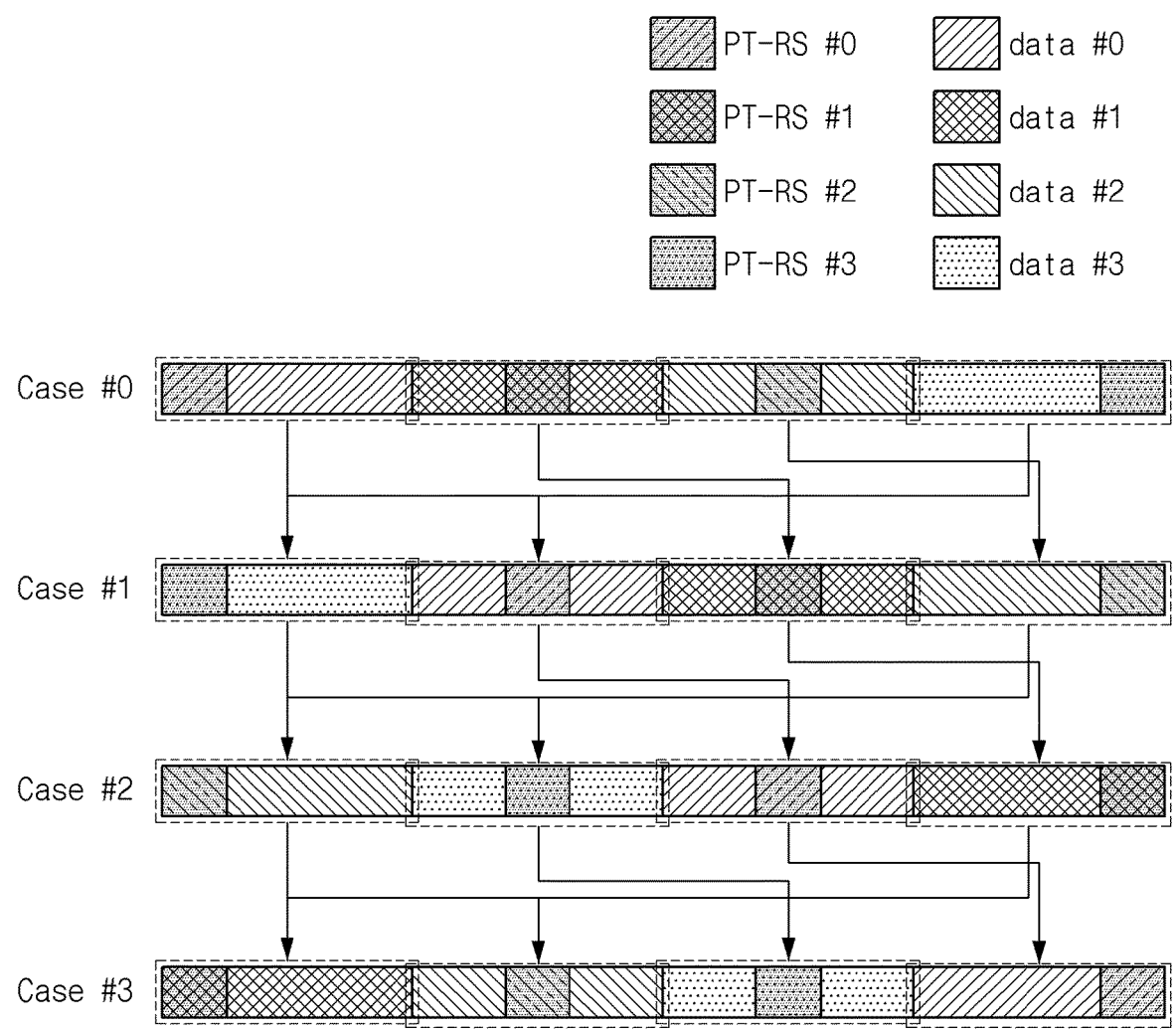
FIG. 33 is a conceptual diagram illustrating an example of applying a data allocation offset in consideration of a phase tracking reference signal configuration applicable to the present disclosure.

FIG. 33 is a conceptual diagram illustrating an example of applying a data allocation offset in consideration of a phase tracking reference signal configuration applicable to the present disclosure.

FIG. 33 may be an example of applying a data allocation offset when the configuration of the phase tracking reference signal is the same as case #3 of FIG. 24. Referring to FIG. 33, when the number of data allocation candidates and the number of phase tracking reference signal groups is 4, the phase tracking reference signal groups may be allocated to resources in the order of case #0 to case #3. In addition, one data may be allocated to be adjacent to each phase tracking reference signal group. For example, in case #0, phase tracking reference signal groups may be allocated in the order of PT-RS #0, PT-RS #1, PT-RS #2, and PT-RS #3, and data may be allocated in the order of data #0, data #1, data #2, and data #3.

The BS may prevent distortion of the phase tracking reference signal configuration by applying the same data allocation offset to the data and the phase tracking reference signal. The data and phase tracking reference signal may be moved, while maintaining the data and phase tracking reference signal configuration. That is, a starting position of data allocation may be changed and phase tracking reference signal mapping may be performed according to Table 1.

For example, when the phase tracking reference signal group and data are allocated as in case #0, the BS may move the phase tracking reference signal group in the order of PT-RS #1, PT-RS #2, PT-RS #3, and PT-RS #0 and may move the data in the order of data #0, data #1, data #2, and data #3 by applying the same data allocation offset to the phase tracking reference signal group and data.

Figure 34:
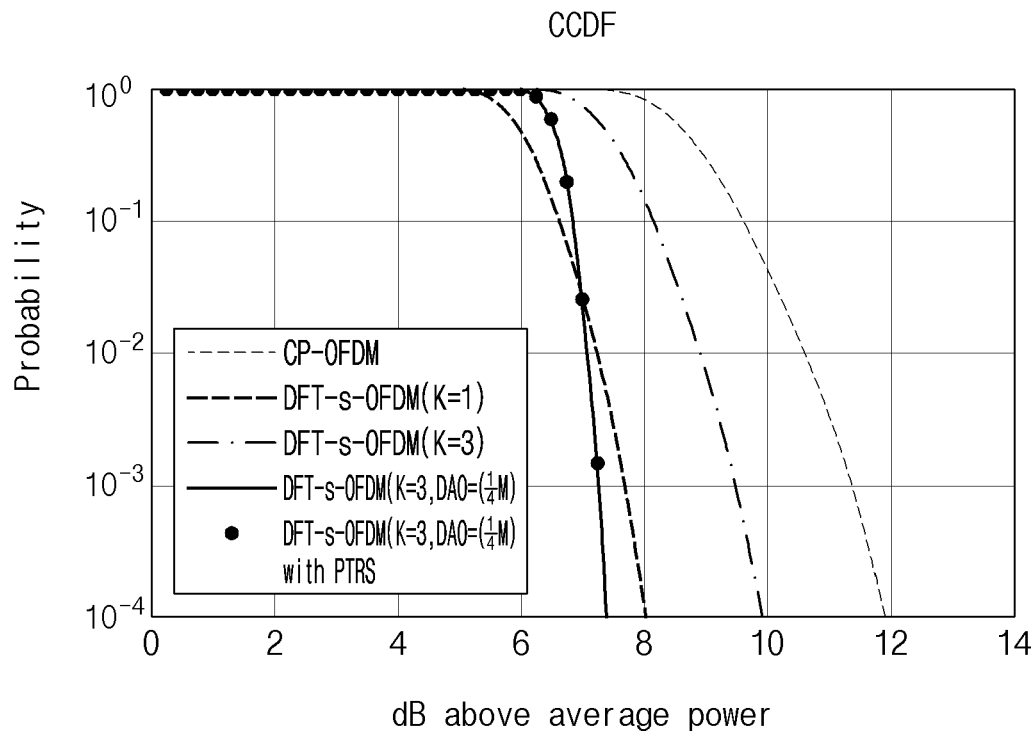
FIG. 34 is a graph illustrating an effect of applying a data allocation offset in consideration of a phase tracking reference signal configuration applicable to the present disclosure.

FIG. 34 is a graph illustrating an effect of applying a data allocation offset in consideration of a phase tracking reference signal configuration applicable to the present disclosure.

FIG. 34 is a graph illustrating PAPRs in the case of using CP-OFDM as an access method, in the case of using DFT-s-OFDM as an access method when the number of FDMed UEs is 1 (cyclic shift is not applied), in the case of using DFT-s-OFDM as an access method when the number of FDMed UEs is 3 (cyclic shift is not applied), in the case of using DFT-s-OFDM as an access method when the number of FDMed UEs is 3 (size of data allocation offset is ¼), and in the case of using DFT-s-OFDM as an access method when the number of FDMed UEs is 3 (size of data allocation offset is ¼ and a phase tracking reference signal configuration is considered). In FIG. 34, the M-DFT size may be 192, the N-IFFT size may be 1024, the size of data allocation offset may be ¼M, the number of phase tracking reference signal groups may be 4, a total data size may be 576, and a modulation order may be QPSK.

Referring to FIG. 34, when a data allocation offset is applied in consideration of the configuration of a phase tracking reference signal, distortion of the phase tracking reference signal configuration is prevented, so that the PAPR is the same as that of a case in which the data allocation offset is applied when the phase tracking reference signal is not allocated.

Figure 35:
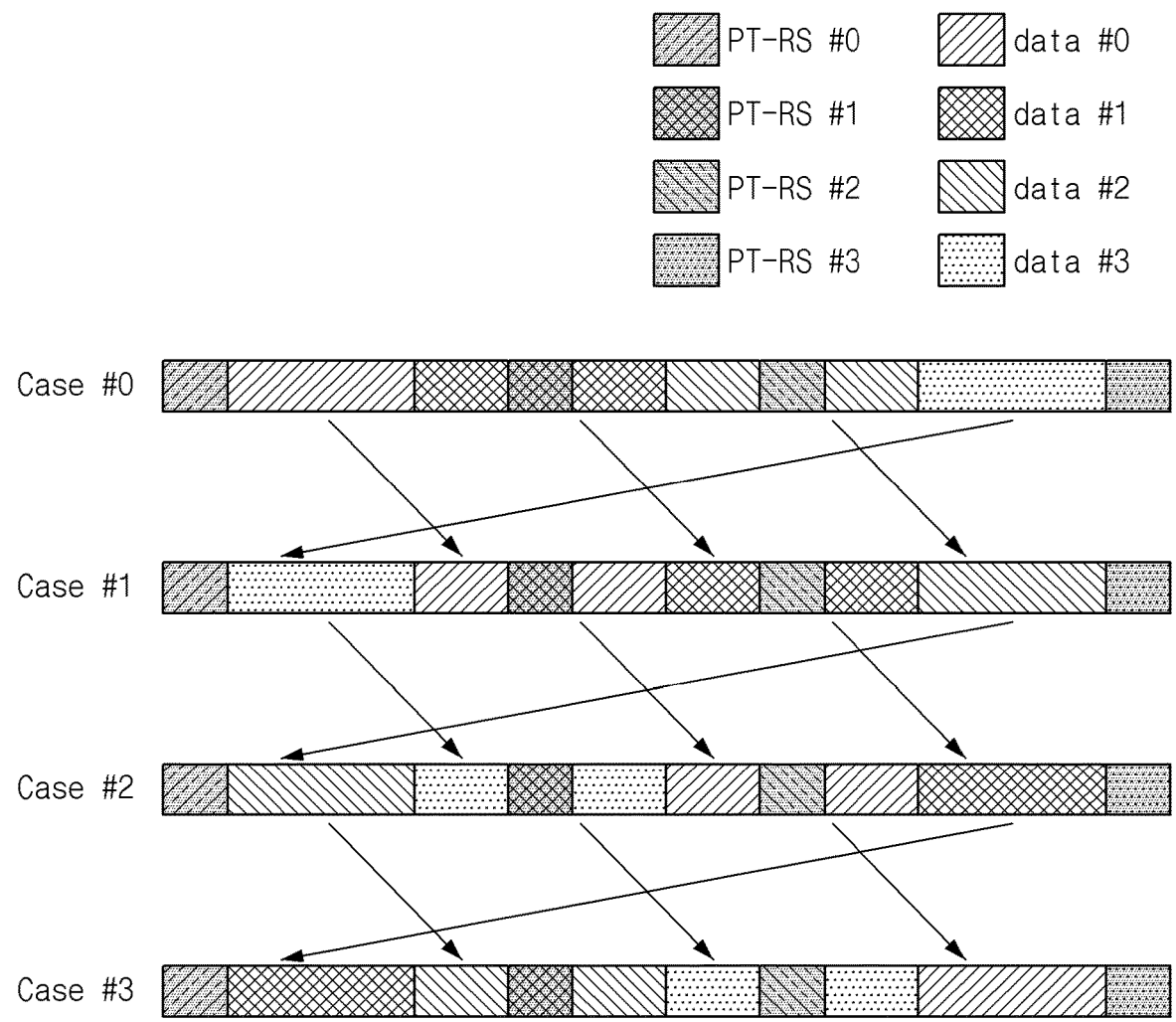
FIG. 35 is a conceptual diagram illustrating an example of applying a data allocation offset in consideration of a phase tracking reference signal configuration applicable to the present disclosure.

FIG. 35 is a conceptual diagram illustrating an example of applying a data allocation offset in consideration of a phase tracking reference signal configuration applicable to the present disclosure.

Referring to FIG. 35, a data allocation offset may be applied only to data, and a data allocation offset may not be applied to a phase tracking reference signal group. That is, the BS may change only a start position of data and maintain the phase tracking reference signal configuration. The magnitude of the phase tracking reference signal for measurement of phase noise may be very small, compared to the magnitude of the phase tracking reference signal and the data, so that the PAPR may be reduced even when the data allocation offset is applied only to the data. For example, the PAPR may decrease even when the data allocation offset is applied only to data and the phase tracking reference signal configuration is maintained, as in cases #0 and case #3.

Figure 36:
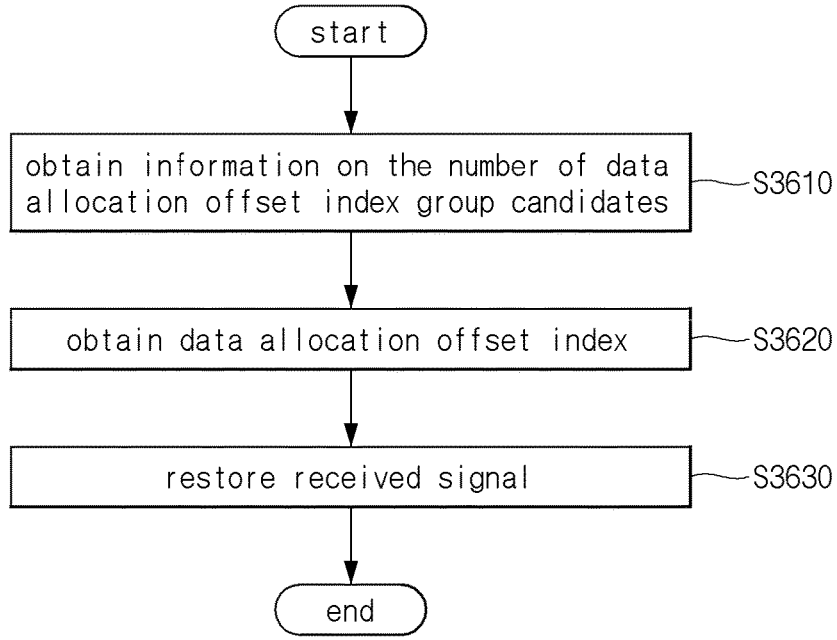
FIG. 36 is a flowchart of a method for restoring a received signal by a UE applicable to the present disclosure.
Figure 37:
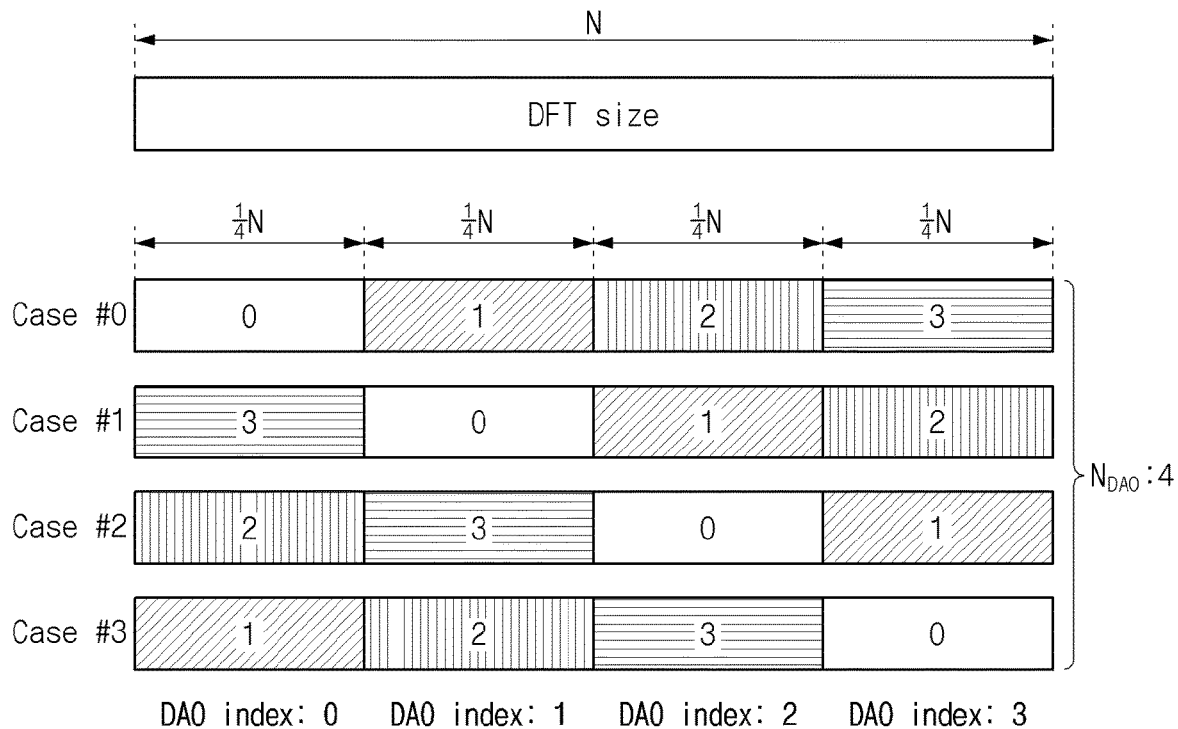
FIG. 37 is a conceptual diagram illustrating a method of restoring a received signal by a UE applicable to the present disclosure.

FIG. 36 is a flowchart of a method for restoring a received signal by a UE applicable to the present disclosure. FIG. 37 is a conceptual diagram illustrating a method of restoring a received signal by a UE applicable to the present disclosure.

When a BS applies a data allocation offset to data for each UE in order to reduce a PAPR, each UE may restore a received signal by obtaining information on a location where data mapping starts.

The UE may obtain information on the number of data allocation offset index group candidates (S3610). The UE may receive an RRC message from the BS. The UE may obtain a coefficient for the number of data allocation offset index group candidates from the RRC message. For example, the UE may obtain a of Equation 1 from the RRC message. The UE may obtain information on the number of data allocation offset index group candidates based on the coefficient for the number of data allocation offset index group candidates. For example, the UE may obtain information on $N_{DAO}$ of Equation 1.

The UE may obtain a data allocation offset index (S3620). The UE may receive downlink control information (DCI) for a downlink grant from the BS. The UE may obtain a data allocation offset index through DCI.

The UE may restore the received signal (S3630). The UE may restore the received signal based on the coefficient for the number of data allocation offset index group candidates obtained in step S3610 and the data allocation offset index obtained in step S3620.

Referring to FIG. 37, for example, when the UE obtains 4 as the number of data allocation offset index group candidates in step S3610 and obtains 1 as the data allocation offset index in step S3620, the UE may recognize that the current received signal corresponds to case and restore the received signal as in case #0 based thereon.

Figure 38:
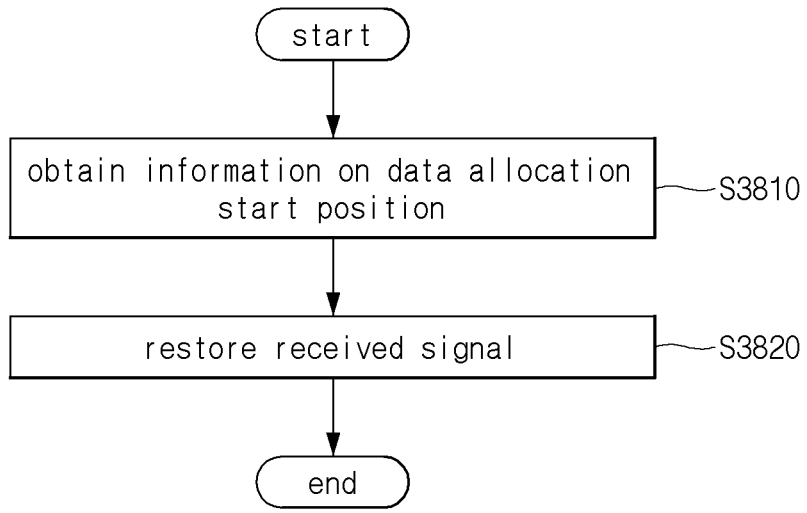
FIG. 38 is a flowchart of a method of restoring a received signal by a UE applicable to the present disclosure.
Figure 39:
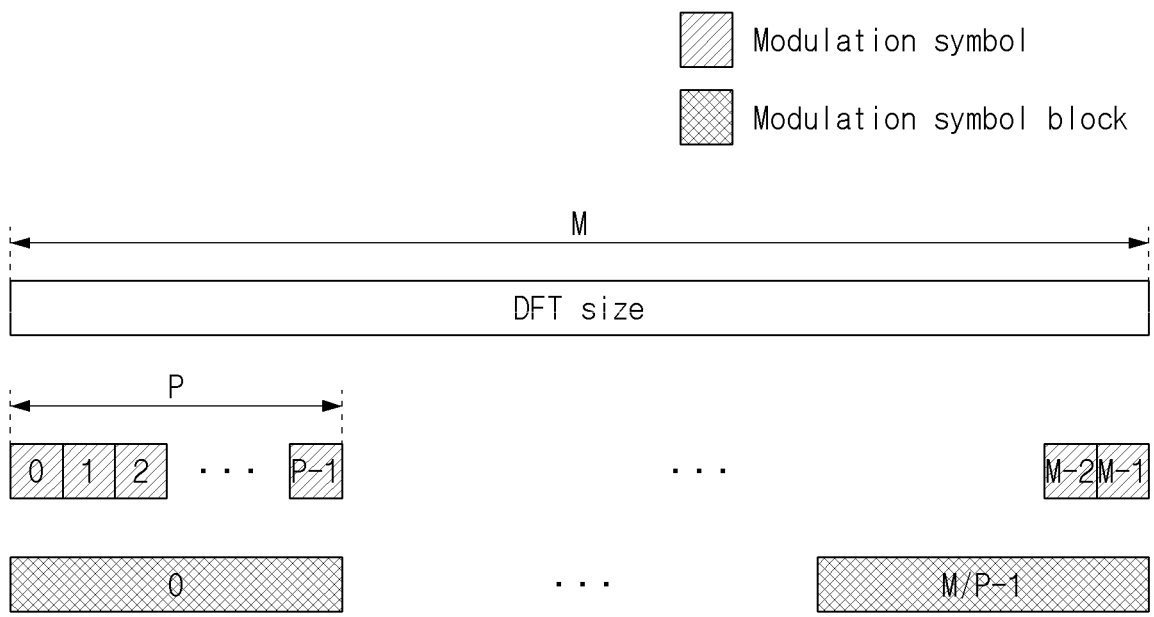
FIG. 39 is a conceptual diagram illustrating a method of restoring a received signal by a UE applicable to the present disclosure.

FIG. 38 is a flowchart of a method for restoring a received signal by a UE applicable to the present disclosure. FIG. 39 is a conceptual diagram illustrating a method of restoring a received signal by a UE applicable to the present disclosure.

Referring to FIG. 38, the UE may obtain information on a data allocation start position (S3810), The UE may receive DCI from the BS. The UE may obtain an index of a modulation symbol block from DCI. Referring to FIG. 39, here, the modulation symbol block may be a unit of input data before performing DFT in DFT-s-OFDM, as P modulation symbols as shown in FIG. 23. The UE may obtain information on the data allocation start position from the index of the modulation symbol block.

The UE may restore the received signal (S3820). The UE may restore the received signal based on the information on the data allocation start position obtained in step S3810.

Figure 40:
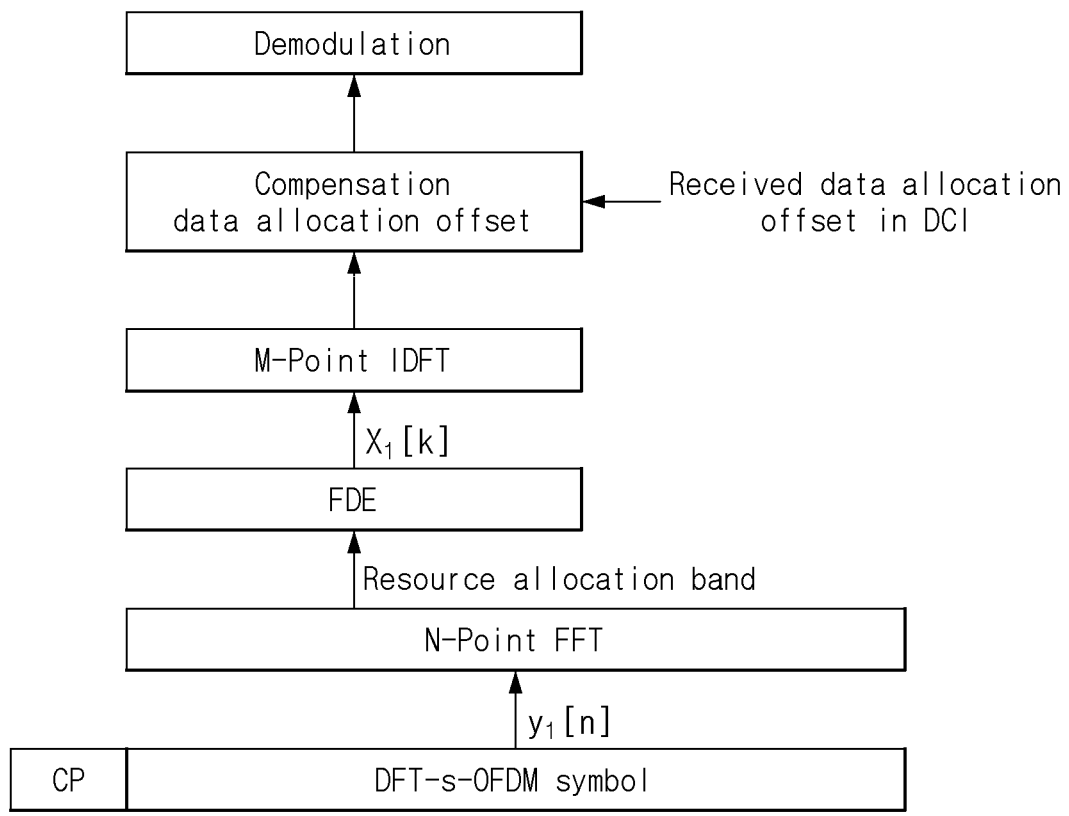
FIG. 40 is a conceptual diagram illustrating a method of decoding a received signal by a UE applicable to the present disclosure.

FIG. 40 is a conceptual diagram illustrating a method of decoding a received signal by a UE applicable to the present disclosure.

Referring to FIG. 40, the UE may receive a downlink signal through a PDSCH. Here, the signal may be obtained by adding a CP to a DFT-s-OFDM symbol. The UE may remove the CP and perform N-point FFT on the DFT-s-OFDM symbol to obtain a resource to which the data and phase tracking reference signal groups are mapped. The UE may perform channel estimation in the frequency domain on the resource, that is, frequency domain channel estimation (FDE). The UE may perform M-point IDFT on the resource on which channel estimation has been performed. The UE may compensate for a data allocation offset for the IDFT-performed resource. The UE may compensate for the data allocation offset by restoring the received signal as described above with reference to FIGS. 36 and 37. Alternatively, the UE may compensate for the data allocation offset by restoring the received signal as described above with reference to FIGS. 38 and 39. The UE may perform demodulation on the resource for which the data allocation offset is compensated. The UE may obtain data by performing demodulation.

The embodiments described above are combinations of elements and features of the present disclosure in a predetermined form. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious that claims that do not explicitly cite each other in the appended claims may be presented in combination as an exemplary embodiment of the present disclosure or included as a new claim by subsequent amendment after the application is filed.

The embodiment according to the present disclosure may be implemented by various means, for example, hardware, firmware, software, or a combination thereof. For implementation by hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

Those skilled in the art will appreciate that the present disclosure may be carried out in other specific ways than those set firth herein without departing from the spirit and essential characteristics of the present disclosure. The above embodiments are therefore to be construed in all aspects as illustrative and not restrictive. The scope of the invention should be determined by the appended claims and their legal equivalents, not by the above description and all changes coming within the meaning and equivalency range of the appended claims are intended to be embraced therein.

What is claimed is:

1. A method performed by a user equipment (UE) in a wireless communication system, the method comprising:
    receiving at least one synchronization signal from a base station (BS);
    receiving system information from the BS;
    receiving a radio resource control (RRC) message from the BS, wherein the RRC message includes information on a number of data allocation offset index group candidates related to a data allocation offset;
    receiving downlink control Information (DCI) from the BS, wherein the DCI includes information on a data allocation offset index related to the data allocation offset;
    receiving a downlink signal from a base BS;
    obtaining a resource to which data and reference signal groups are mapped, wherein the data allocation offset is applied to the resource;
    compensating for a data allocation offset applied to the resource based on the information on a number of data allocation offset index group candidates and the data allocation offset index; and
    performing demodulation on the resource for which the data allocation offset is compensated and obtaining the data.

2. The method of claim 1, wherein
    the obtaining a resource to which data and reference signals group are mapped includes:
    removing a cyclic prefix (CP) from the downlink signal and obtaining a discrete Fourier transform spread orthogonal frequency division multiplexing (DFT-s-OFDM) symbol; and
    performing fast Fourier transform (FFT) on the TUFT-s-OFDM symbol to obtain the resource to which the data and the reference signal groups are mapped.

3. The method of claim 2, wherein the data allocation offset is set to minimize a peak-to-average power ratio (PAPR) of the DFT-s-OFDM symbol.

4. The method of claim 1, wherein the number of data allocation offset index group candidates is less than or equal to the number of reference signal groups.

5. A user equipment (UE) operating in a wireless communication system, the UE comprising:
    one or more transceivers;
    one or more processors configured to control the one or more transceivers; and
    a memory including one or more instructions to be executed by the one or more processors,
    wherein the one or more instructions include:
    receiving at least one synchronization signal from a base station (BS);
    receiving system information from the BS;
    receiving a radio resource control (RRC) message from the BS;
    receiving downlink control Information (DCI) from the BS, wherein the DCI includes information on a modulation symbol block index related to a data allocation offset;
    receiving a downlink signal from a base BS;
    obtaining a resource to which data and reference signal groups are mapped, wherein the data allocation offset is applied to the resource;
    compensating for a data allocation offset applied to the resource based on the information on the modulation symbol block index;
    performing demodulation on the resource for which the data allocation offset is compensated and obtaining the data.

6. The UE of claim 5, wherein
    the obtaining a resource to which data and reference signals group are mapped includes:
    removing a cyclic prefix (CP) from the downlink signal and obtaining a discrete Fourier transform spread orthogonal frequency division multiplexing (DFT-s-OFDM) symbol; and
    performing fast Fourier transform (FFT) on the DFT-s-OFDM symbol to obtain the resource to which the data and the reference signal groups are mapped.

7. The UE of claim 6, wherein the data allocation offset is set to minimize a peak-to-average power ratio (PAPR) of the DFT-s-OFDM symbol.

8. The UE of claim 5, wherein the number of data allocation offset index group candidates is less than or equal to the number of reference signal groups.

9. A base station (BS) operating in a wireless communication system, the BS comprising:
    at least one transceiver;
    at least one processor configured to control the at least one transceiver; and,
    a memory including at least one instruction to be executed by the at least one processor, wherein the at least one instruction includes:
applying a data allocation offset to each of a plurality of resources to which data and reference signal groups for each of a plurality of user equipments (UEs) are mapped:
performing discrete Fourier transform (DFT) on each of the plurality of resources to which the data allocation offset is applied;
performing an inverse fast Fourier transform (IFFT) on each of the plurality of resources on which the DFT is performed, to generate a discrete Fourier transform spread orthogonal frequency division multiplexing (DFT-s-OFDM) symbol; and
adding a cyclic prefix (CP) to the DFT-s-OFDM symbol to generate a downlink signal.

10. The BS of claim 9, wherein the data allocation offset is set to minimize a peak-to-average power ratio (PAPR) of the DFT-s-OFDM symbol.

11. The BS of claim 9, wherein the applying of the data allocation offset to each of the plurality of resources includes applying the same data allocation offset to the data and the reference signal group.

12. The BS of claim 9, wherein the applying of the data allocation offset to each of the plurality of resources includes applying the data allocation offset to the data mapped to each of the plurality of resources.

* * * * *